United States Patent
Son et al.

(10) Patent No.: US 11,003,326 B2
(45) Date of Patent: May 11, 2021

(54) WEARABLE DEVICE AND CONTROLLING METHOD THEREOF

(71) Applicant: LG ELECTRONICS INC., Seoul (KR)

(72) Inventors: Howon Son, Seoul (KR); Jungmin Park, Seoul (KR); Heejae Kim, Seoul (KR); Jungchul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 15/752,716

(22) PCT Filed: Nov. 17, 2015

(86) PCT No.: PCT/KR2015/012330
§ 371 (c)(1),
(2) Date: Feb. 14, 2018

(87) PCT Pub. No.: WO2017/030244
PCT Pub. Date: Feb. 23, 2017

(65) Prior Publication Data
US 2018/0232120 A1    Aug. 16, 2018

(30) Foreign Application Priority Data
Aug. 17, 2015  (KR) .................. 10-2015-0115219

(51) Int. Cl.
*G06F 8/38*        (2018.01)
*G06F 3/0483*   (2013.01)
(Continued)

(52) U.S. Cl.
CPC .......... *G06F 3/0483* (2013.01); *G06F 1/1643* (2013.01); *G06F 1/1652* (2013.01);
(Continued)

(58) Field of Classification Search
CPC .. G02F 1/13338; G02F 1/1652; G06F 3/0412; G06F 2203/04102; G06F 1/1641; G09G 2380/02; H01L 2251/5338
See application file for complete search history.

(56) References Cited

U.S. PATENT DOCUMENTS

| | | | |
|---|---|---|---|
| 7,665,039 B2 * | 2/2010 | Chaudhri | G06F 3/0485 715/815 |
| 9,134,905 B2 * | 9/2015 | Kim | G06F 3/04886 |

(Continued)

FOREIGN PATENT DOCUMENTS

WO    WO 2013/077537 A1    5/2013

*Primary Examiner* — Maikhanh Nguyen
(74) *Attorney, Agent, or Firm* — Birch, Stewart, Kolasch & Birch, LLP

(57) ABSTRACT

Disclosed are a wearable device and controlling method thereof. The present invention includes displaying a $1^{st}$ information of a specific content on a $1^{st}$ region of a screen, receiving an input for adjusting a screen length by unrolling a rollable display module for displaying the screen from a user by being initially rolled up, displaying the $1^{st}$ information a portion or whole part of a $2^{nd}$ region in response to the received input, and displaying a $2^{nd}$ information of the specific content different from the $1^{st}$ information on the $1^{st}$ region, wherein the amount of the $2^{nd}$ information is determined depending on a size of the $2^{nd}$ region.

18 Claims, 15 Drawing Sheets

(51) Int. Cl.
*G06F 1/16* (2006.01)
*G06F 3/0488* (2013.01)
*G06F 3/0485* (2013.01)

(52) U.S. Cl.
CPC ........ *G06F 3/0485* (2013.01); *G06F 3/04855* (2013.01); *G06F 3/04883* (2013.01); *G06F 3/04886* (2013.01)

(56) References Cited

U.S. PATENT DOCUMENTS

| | | | | |
|---|---|---|---|---|
| 9,189,142 B2* | 11/2015 | Kim | | G06F 3/0488 |
| 9,426,275 B2* | 8/2016 | Eim | | G06F 3/04817 |
| 9,753,543 B2* | 9/2017 | Jeon | | G06F 1/1652 |
| 9,772,762 B2* | 9/2017 | Kim | | G06F 3/04847 |
| 10,338,638 B2* | 7/2019 | Park | | G06F 1/1656 |
| 2006/0209218 A1* | 9/2006 | Lee | | G04G 9/00 349/1 |
| 2008/0052637 A1* | 2/2008 | Ben-Yoseph | | G06F 3/0481 715/800 |
| 2012/0017162 A1* | 1/2012 | Khokhlov | | G06F 9/451 715/765 |
| 2013/0268883 A1* | 10/2013 | Kim | | G06F 3/04847 715/784 |
| 2013/0275875 A1* | 10/2013 | Gruber | | G10L 15/22 715/728 |
| 2013/0275910 A1 | 10/2013 | Kim et al. | | |
| 2014/0082536 A1 | 3/2014 | Costa et al. | | |
| 2014/0137041 A1 | 5/2014 | Jeon et al. | | |
| 2014/0218375 A1* | 8/2014 | Kim | | G06F 3/048 345/501 |
| 2014/0267160 A1* | 9/2014 | Kim | | G06F 3/0482 345/174 |
| 2014/0304641 A1* | 10/2014 | Kim | | G06F 3/04883 715/777 |
| 2015/0143225 A1* | 5/2015 | Pflueger | | G06F 40/14 715/234 |
| 2015/0309535 A1* | 10/2015 | Connor | | G06F 1/163 361/679.03 |
| 2016/0026333 A1* | 1/2016 | Kim | | G06F 3/044 345/173 |
| 2016/0320871 A1* | 11/2016 | Li | | G06F 3/041 |

\* cited by examiner

[Fig. 1a]
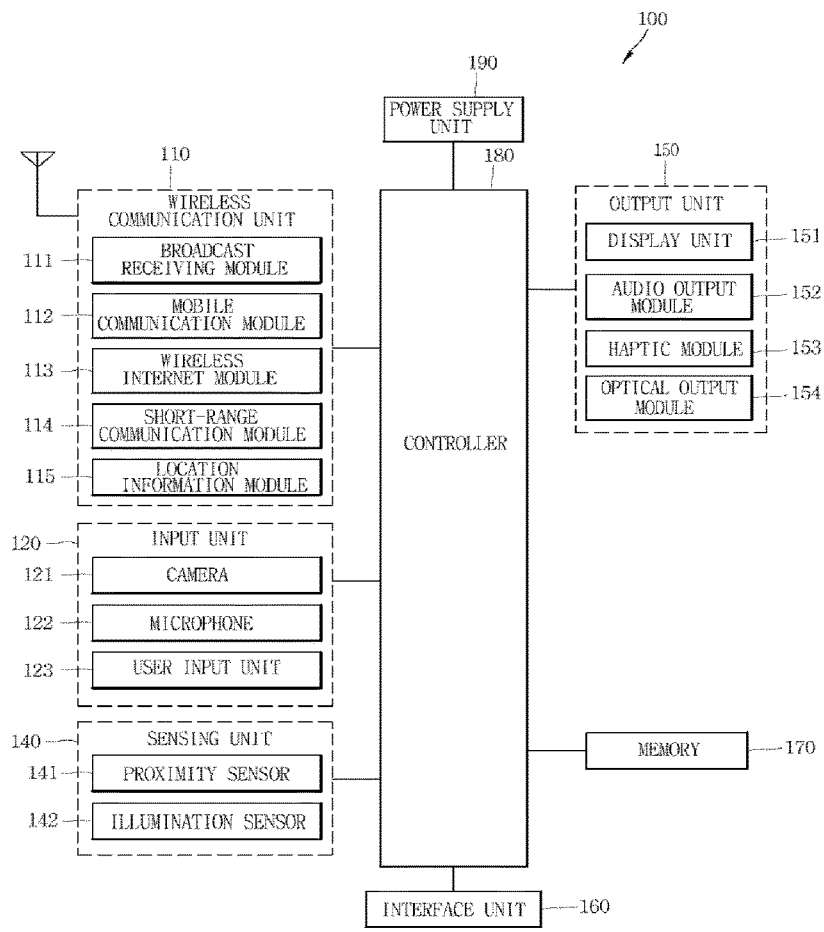
[Fig. 1b]
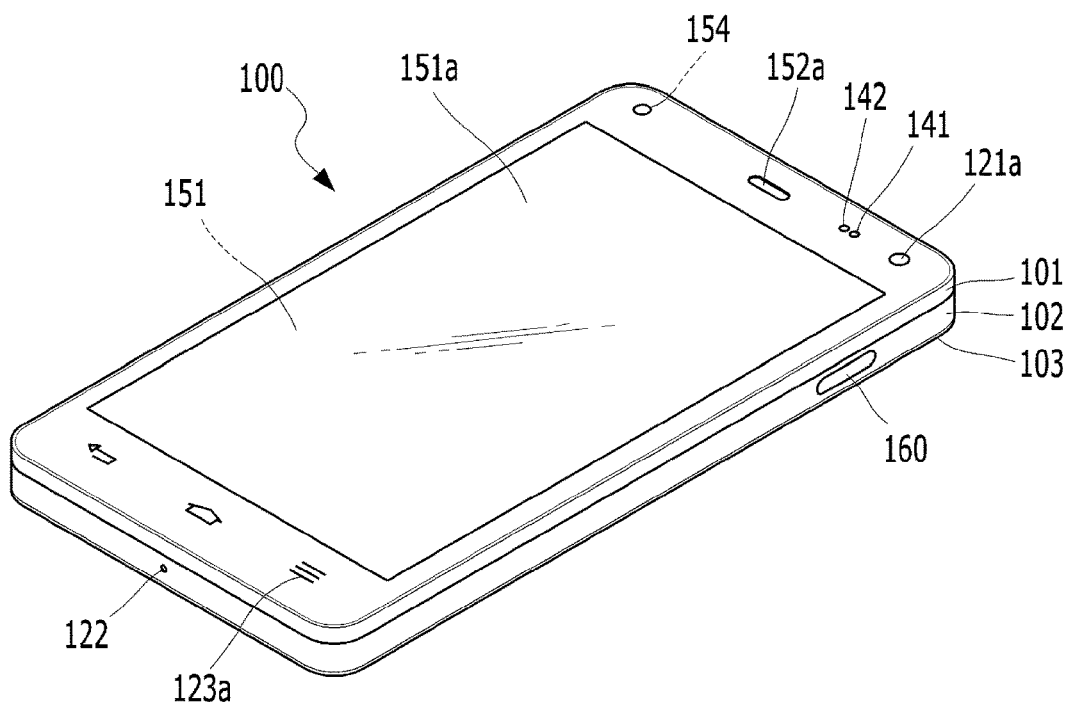

[Fig. 1c]
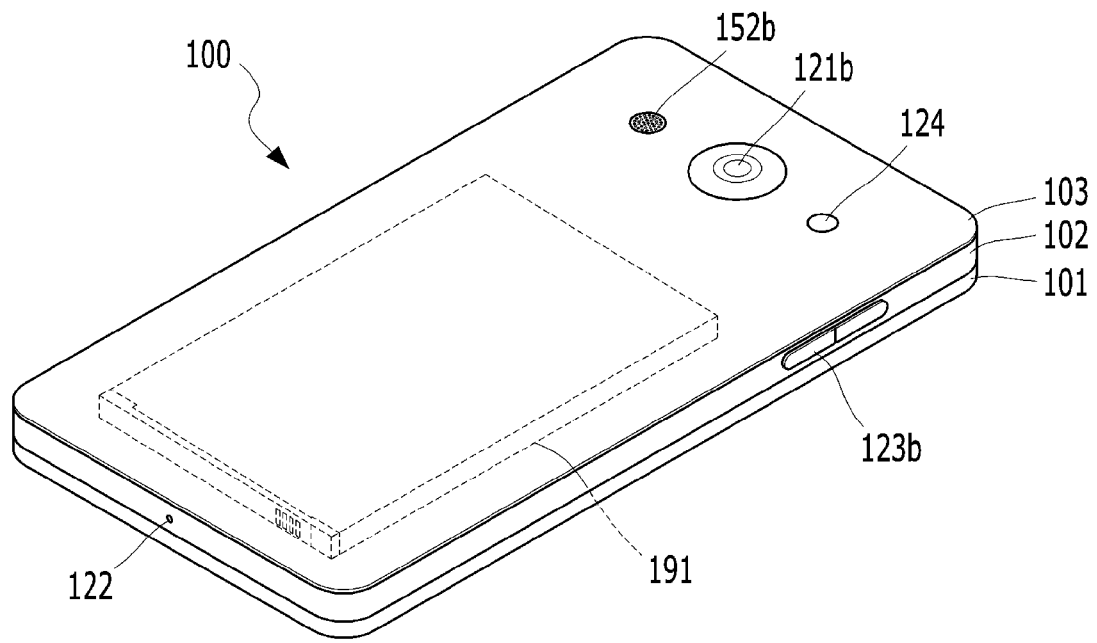
[Fig. 2]
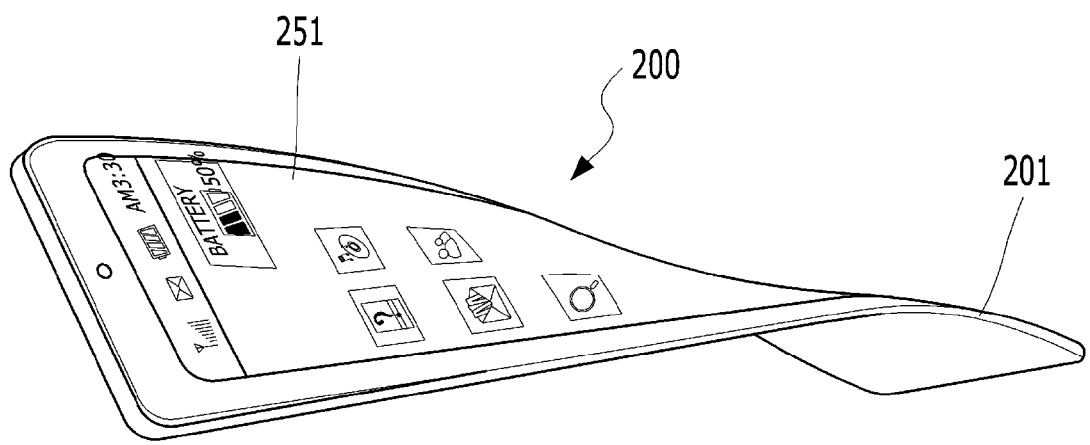

[Fig. 3]
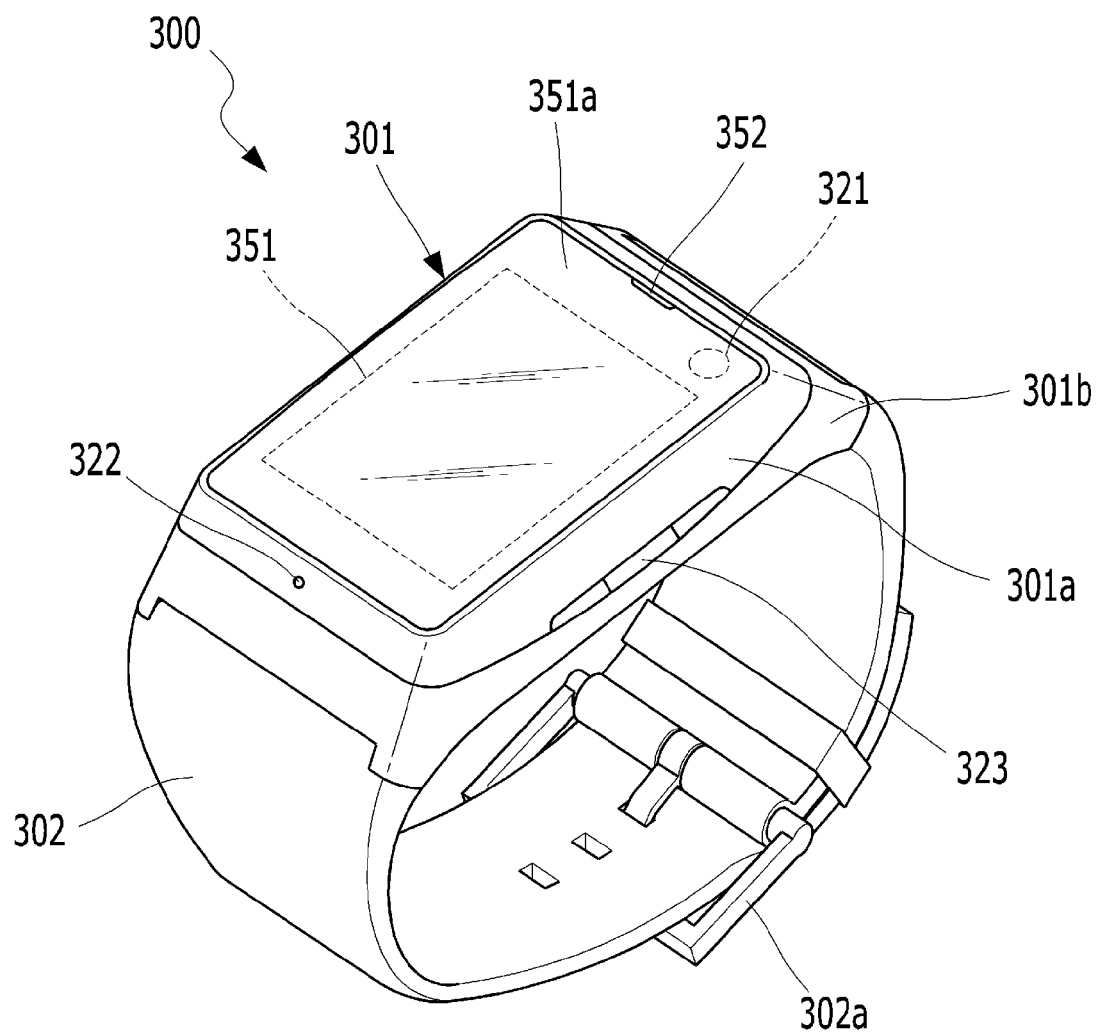

[Fig. 4]
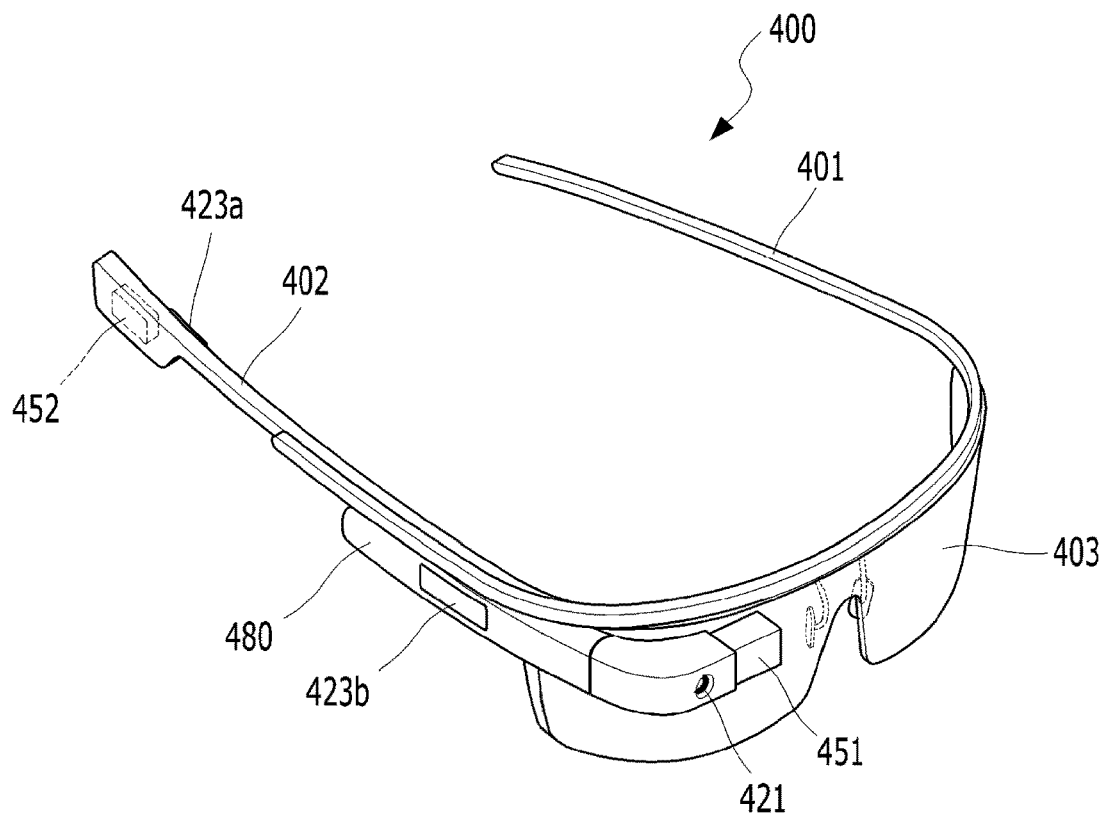
[Fig. 5]
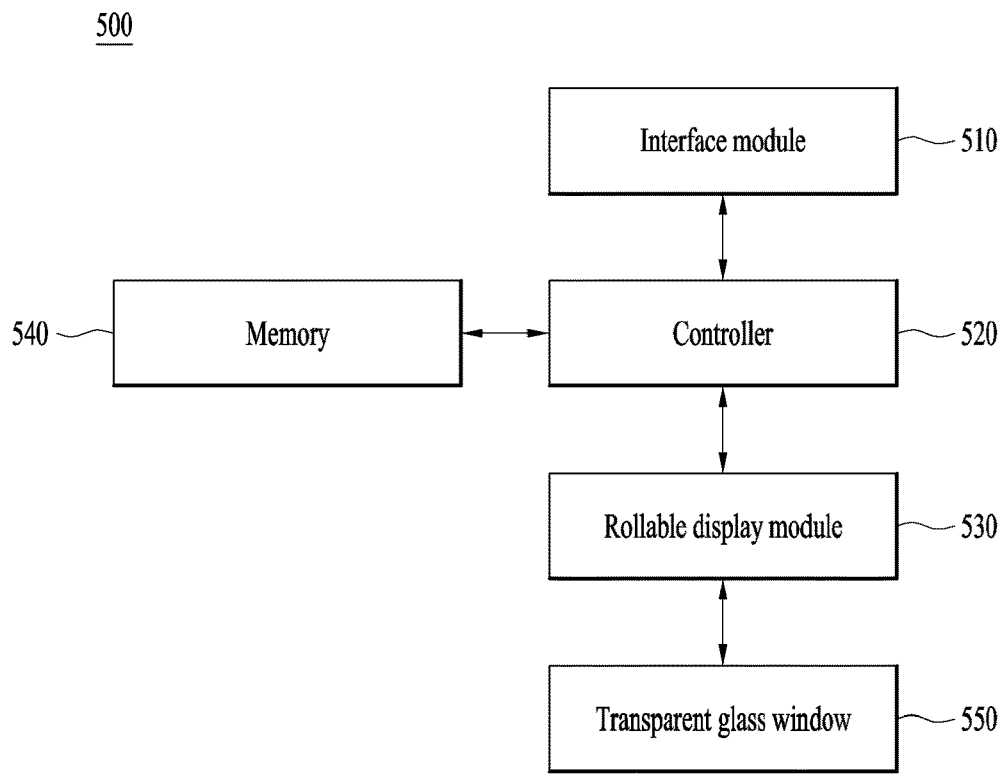

[Fig. 6]
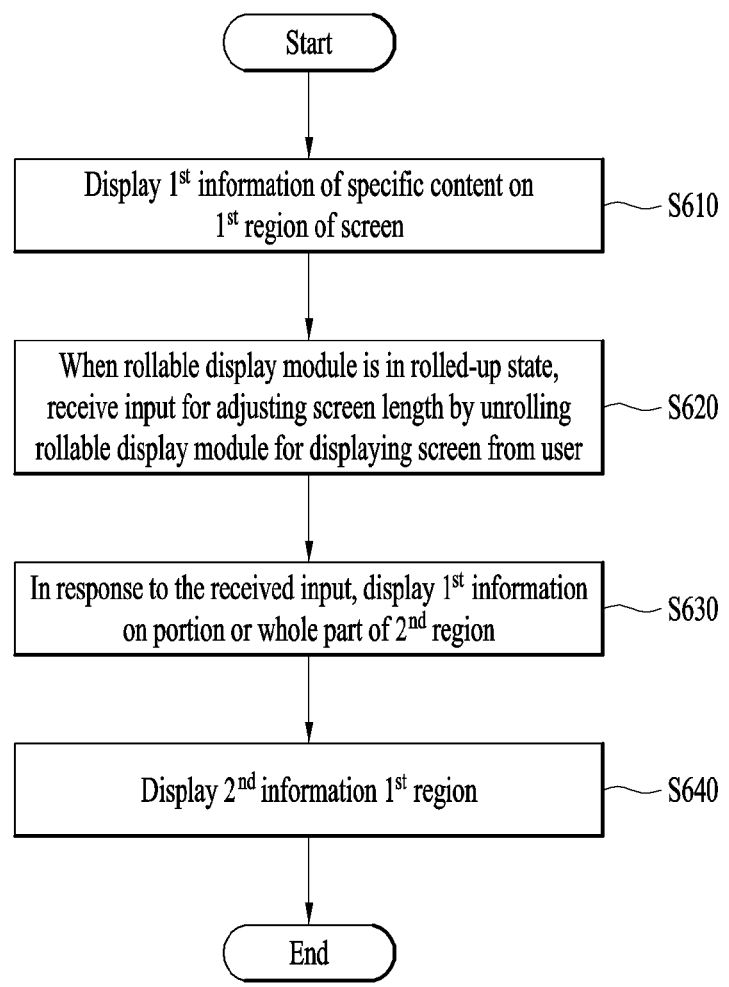

[Fig. 7]
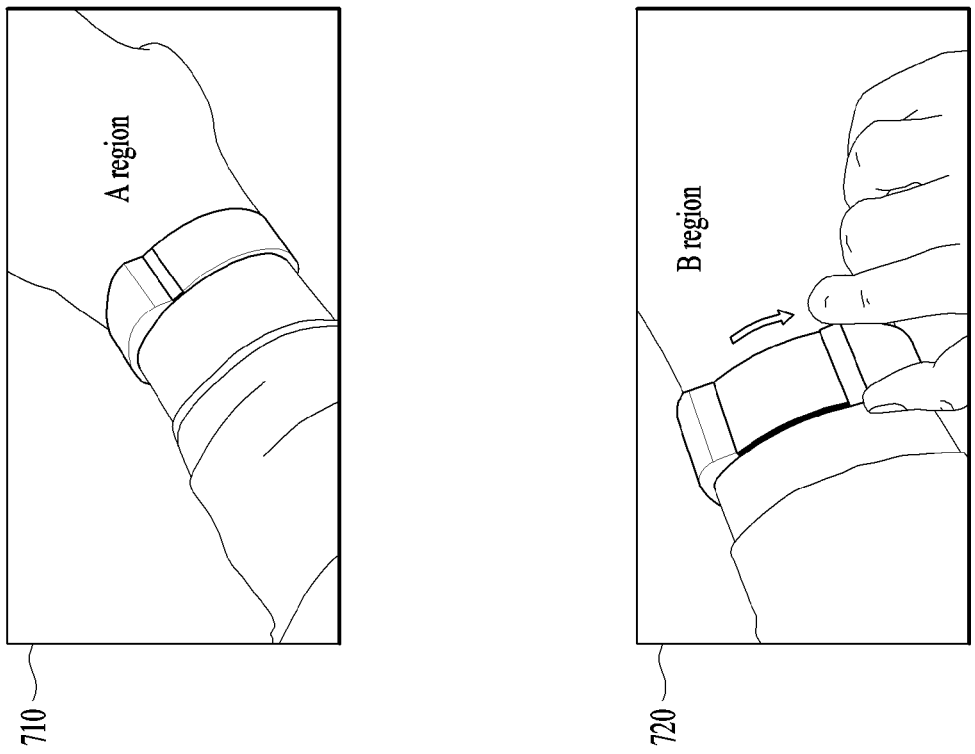
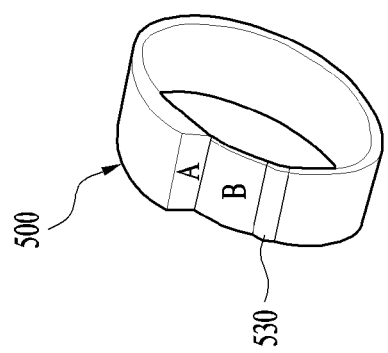

[Fig. 8]
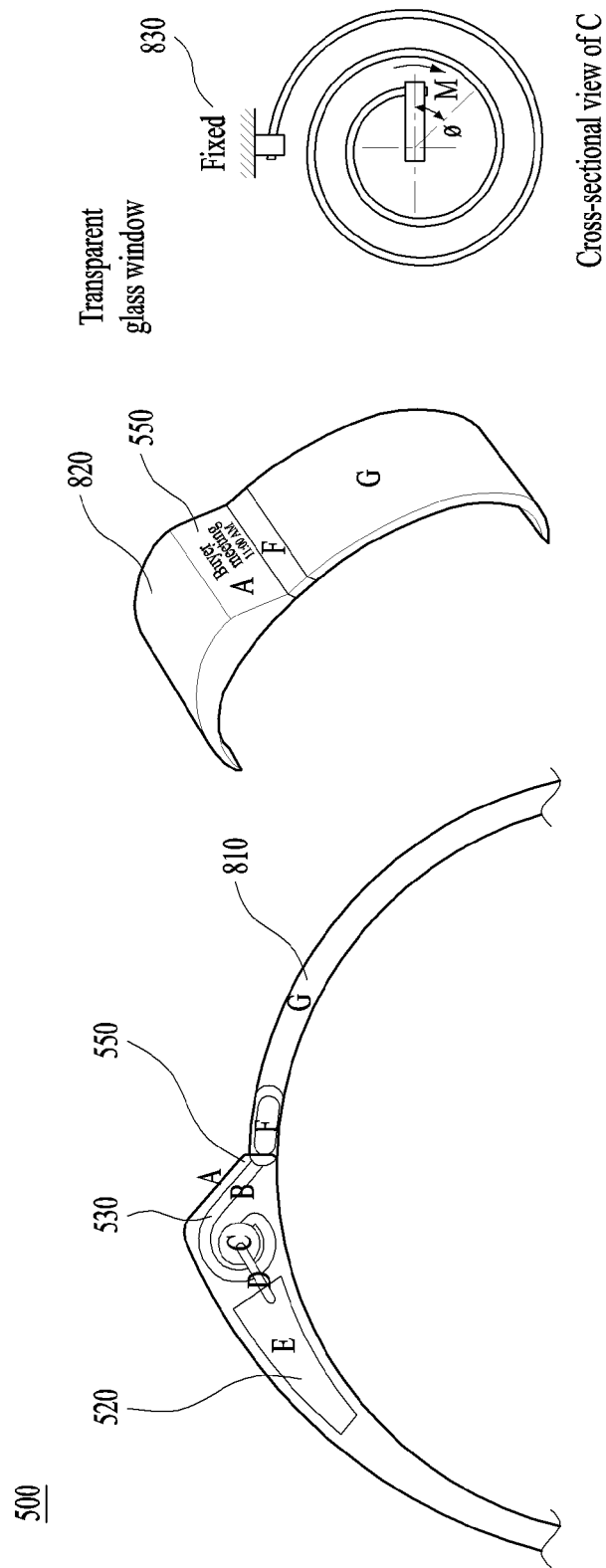

[Fig. 9]
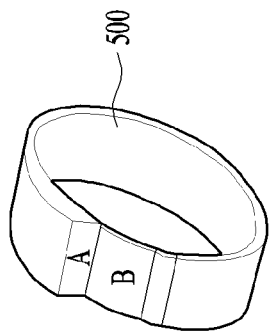

[Fig. 10]
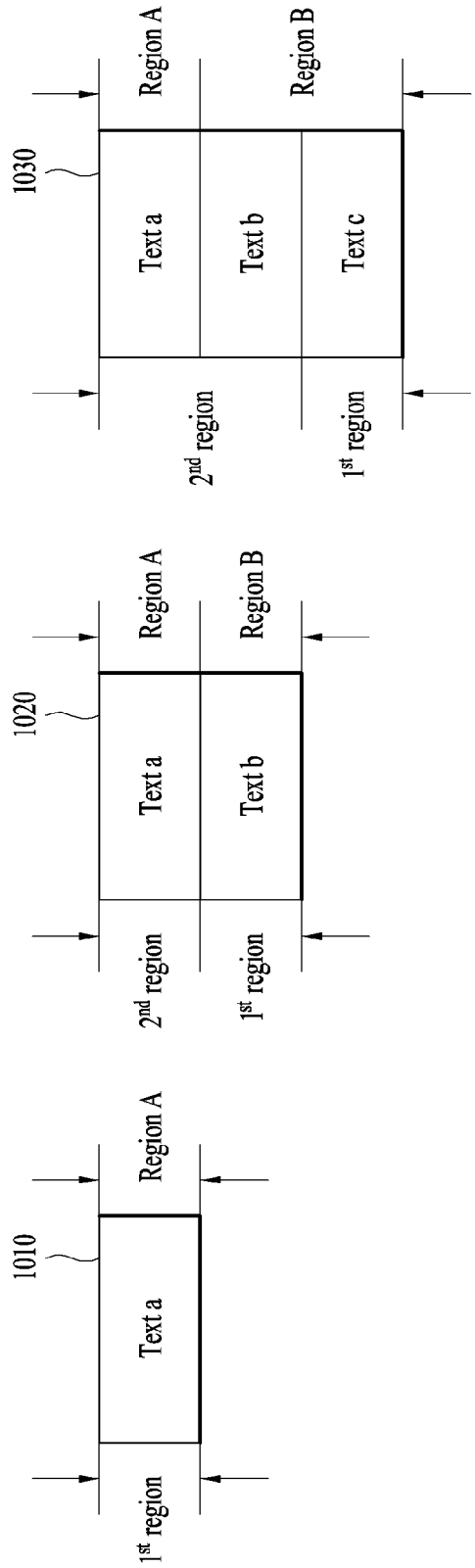

[Fig. 11]
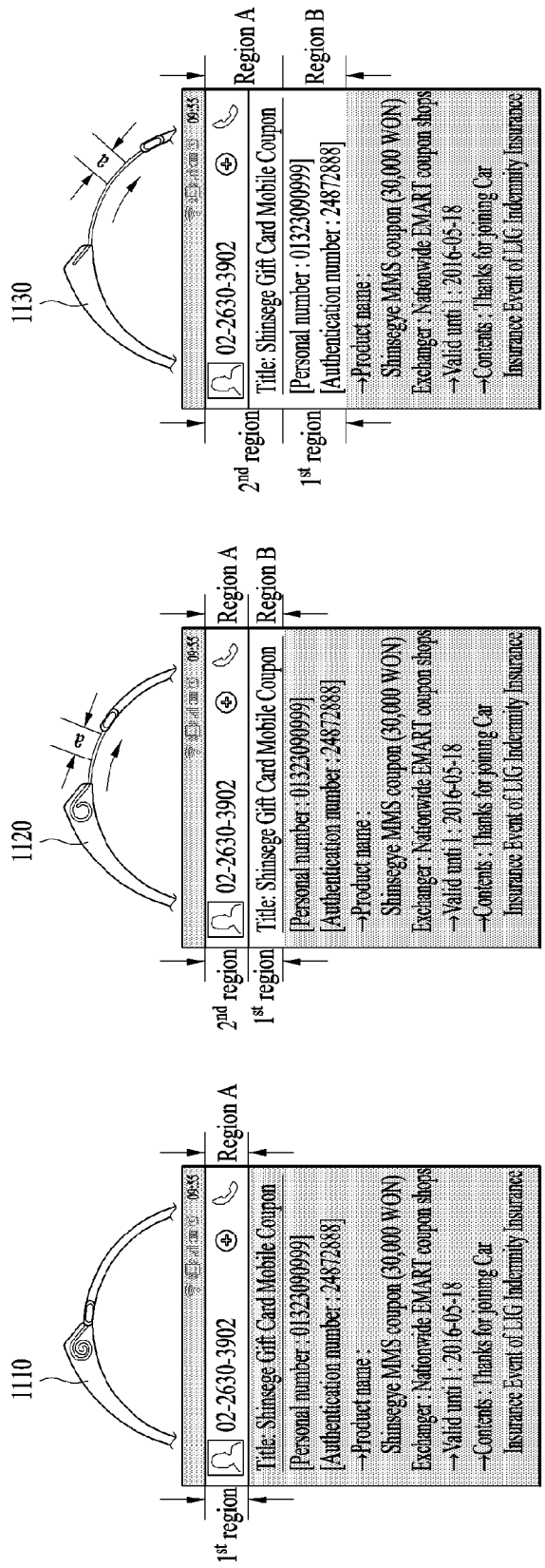

[Fig. 12]
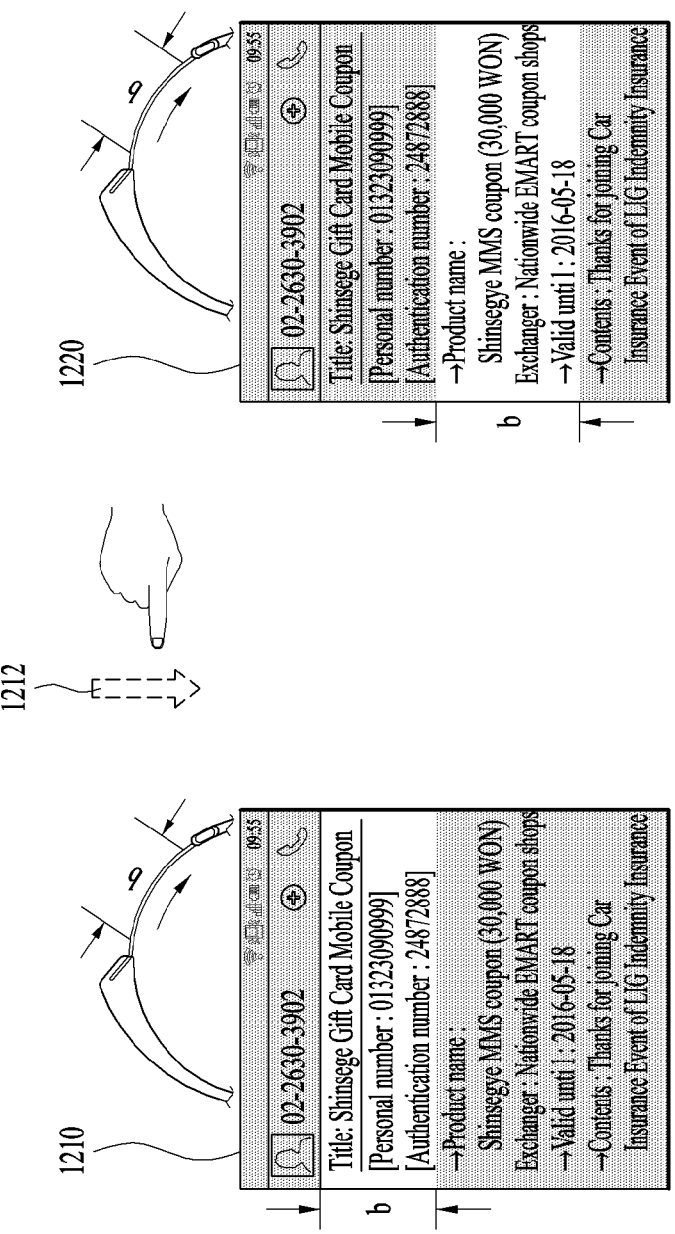

[Fig. 13]
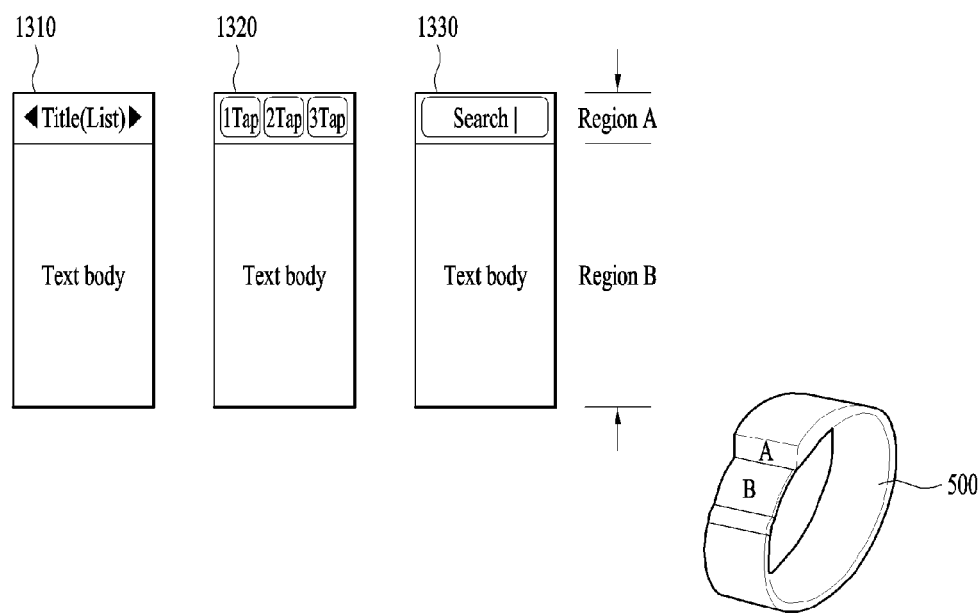
[Fig. 14]
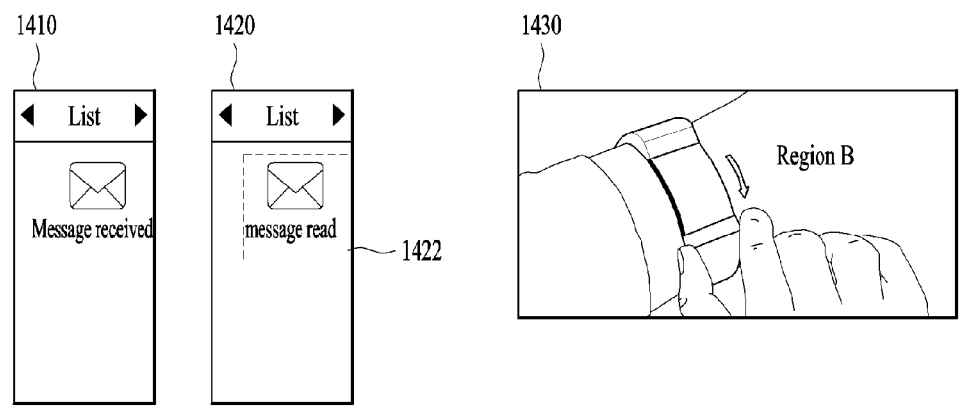

[Fig. 15]
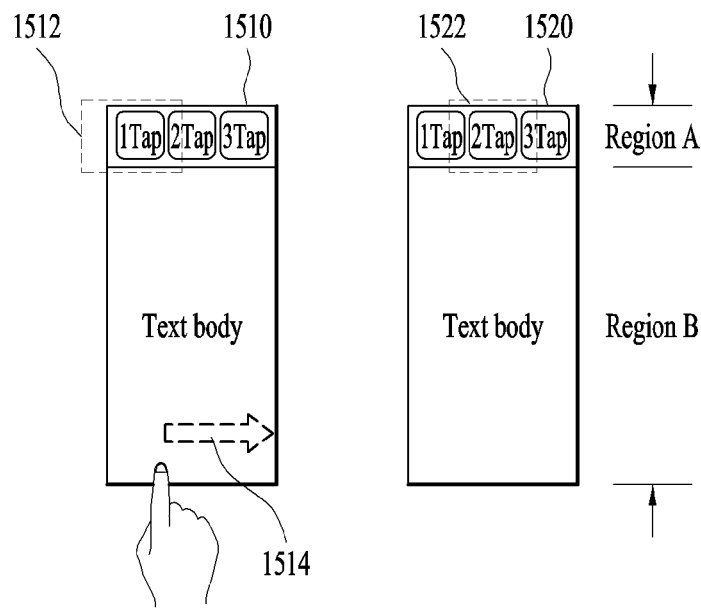
[Fig. 16]
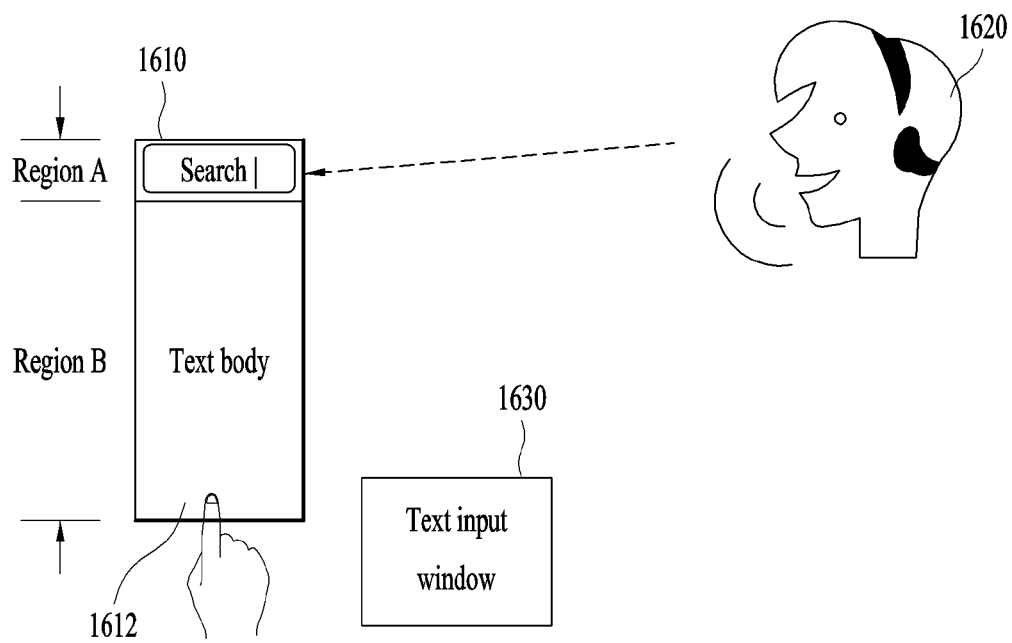

[Fig. 17]
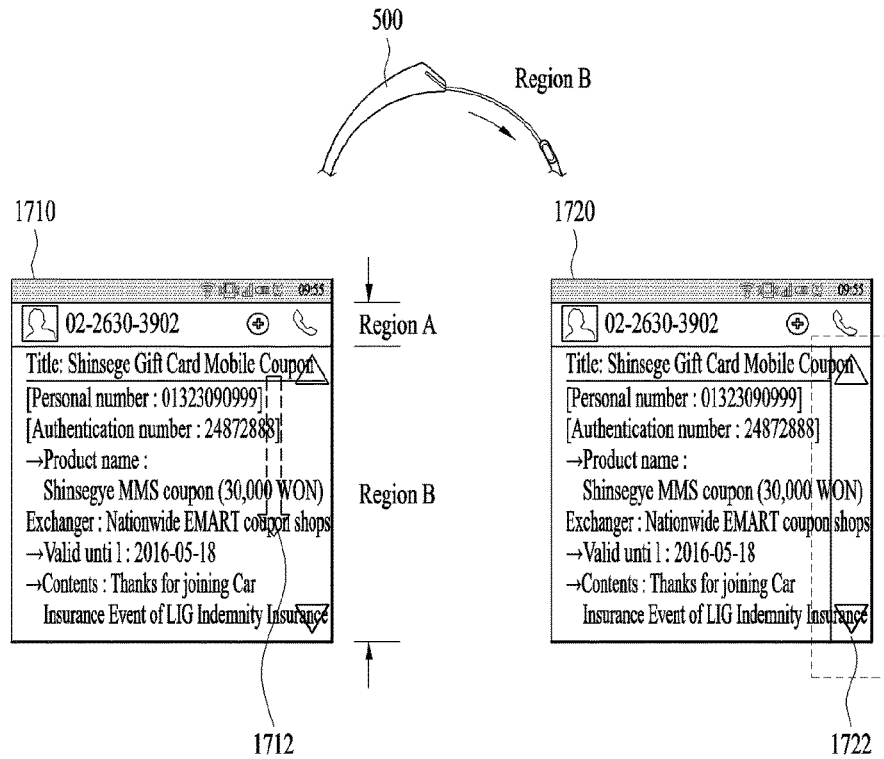
[Fig. 18]
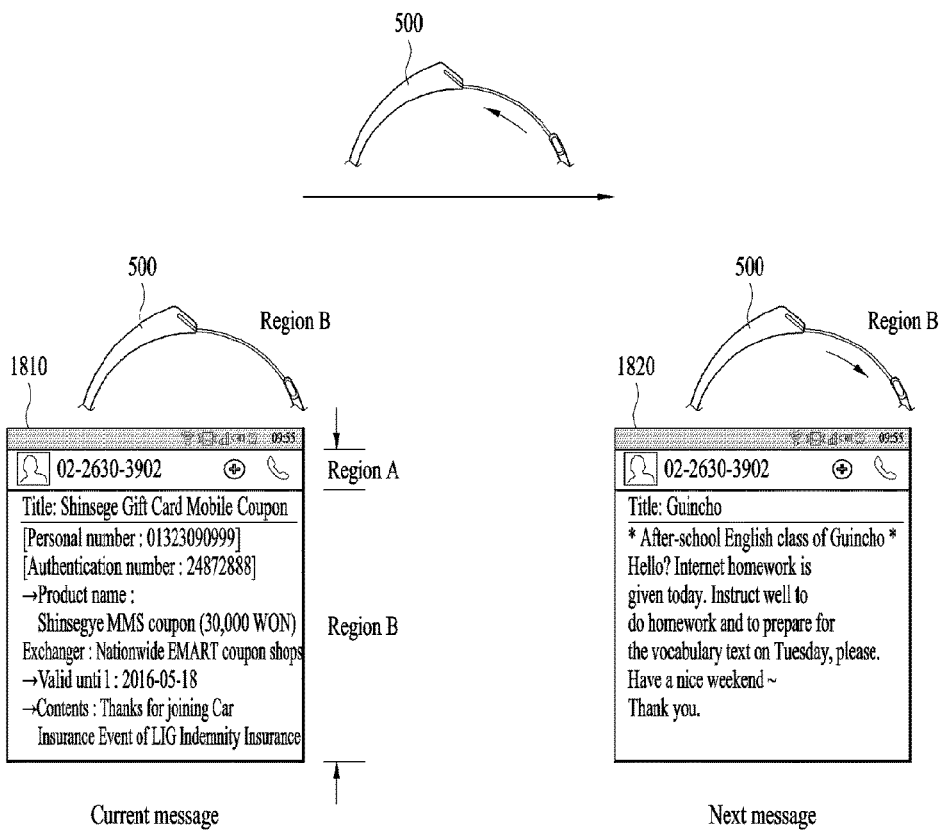

[Fig. 19]
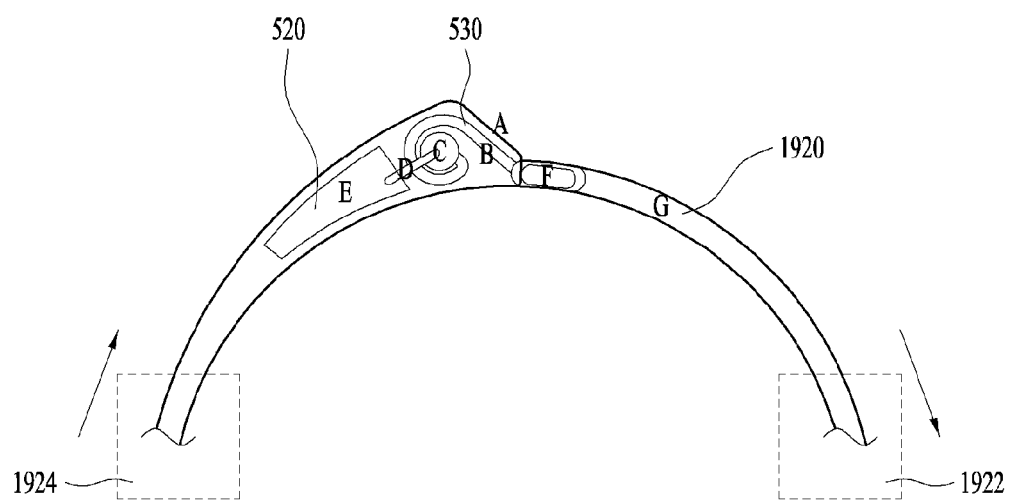
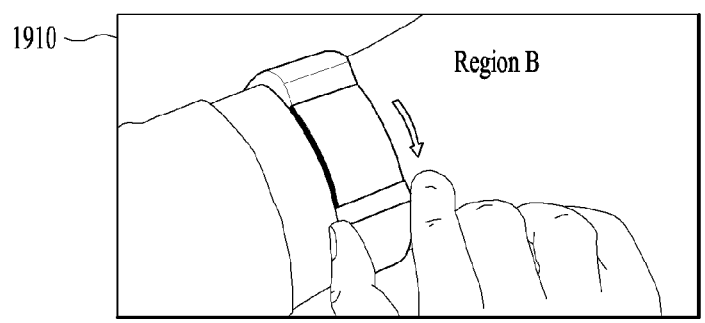

WEARABLE DEVICE AND CONTROLLING METHOD THEREOF

CROSS REFERENCE TO RELATED APPLICATIONS

This application is the National Phase of PCT International Application No. PCT/KR2015/012330, filed on Nov. 17, 2015, which claims priority under 35 U.S.C. 119(e) to U.S. Provisional Application No. 10-2015-0115219, filed on Aug. 17, 2015, all of which are hereby expressly incorporated by reference into the present application.

TECHNICAL FIELD

The present invention relates to a wearable device and controlling method thereof, and more particularly, to a mobile device and controlling method thereof. Although the present invention is suitable for a wide scope of applications, it is particularly suitable for displaying a critical information on an initial screen in a state that a rollable display module is rolled up and then displaying the critical information and a detailed information on an extended screen of which screen length is extended by pulling out the rollable display module.

BACKGROUND ART

Recently, owing to the developments of the IT technologies, a wearable device becomes a big issue in daily life. Particularly, it is highly possible that the wearable device will be utilized as a tool for performing various functions in daily life in association with a rollable display.

The rollable display means a flexible or bendable display device. According to the technical features of the rollable display, in an existing LCD or OLED (organic light emitting diode), foldable flexibility is provided in a manner of substituting a glass substrate with a plastic film. As the rollable display is thin with light weight, shockproof, flexible and bendable, it can be manufactured in various forms.

According to a related art, e-books and e-newspapers are produced using the flexible or bendable features of the rollable display. However, as the e-book or e-newspaper of the related art has a considerable volume, it is inconvenient for a user to use the e-book or the e-newspaper.

DISCLOSURE OF INVENTION

Technical Problem

Accordingly, objects of the present invention are to address the above-noted and other problems.

One object of the present invention is to provide a wearable device and controlling method thereof, by which critical information can be displayed on a screen in an initial state that a rollable display module is rolled up and by which critical information and detailed information can be displayed on a screen in a state that the rollable display module is unrolled.

Another object of the present invention is to provide a wearable device and controlling method thereof, by which a $1^{st}$ information is displayed on a $1^{st}$ region using the property of a bendable and rollable display module and by which a $2^{nd}$ information and the $1^{st}$ information are displayed on the $1^{st}$ region and a portion or whole part of a $2^{nd}$ region in accordance with a screen length extension of the rollable display module, respectively.

Another object of the present invention is to provide a wearable device and controlling method thereof, by which user convenience can be enhanced in a manner of running a function of automatically scrolling a screen in response to a user's action of pulling out a rollable display module to the end.

Another object of the present invention is to provide a wearable device and controlling method thereof, by which user convenience can be enhanced in a manner of switching a current message to a next message in response to a user's action of pulling out a rollable display module to the end and then releasing the rollable display module.

Further object of the present invention is to provide a wearable device and controlling method thereof, by which user convenience can be enhanced in a manner that a current message is handed as read in response to a user's action of pulling out a rollable display module slightly and then releasing the rollable display module.

Technical tasks obtainable from the present invention are non-limited by the above-mentioned technical tasks. And, other unmentioned technical tasks can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of controlling a wearable device according to one embodiment of the present invention includes the steps of displaying a $1^{st}$ information of a specific content on a $1^{st}$ region of a screen, receiving an input for adjusting a screen length by unrolling a rollable display module for displaying the screen from a user by being initially rolled up, displaying the $1^{st}$ information a portion or whole part of a $2^{nd}$ region in response to the received input, and displaying a $2^{nd}$ information of the specific content different from the $1^{st}$ information on the $1^{st}$ region, wherein the amount of the $2^{nd}$ information is determined depending on a size of the $2^{nd}$ region.

To further achieve these and other advantages and in accordance with the purpose of the present invention, as embodied and broadly described, a wearable device according to another embodiment of the present invention includes a controller displaying a $1^{st}$ information of a specific content on a $1^{st}$ region of a screen, the controller receiving an input for adjusting a screen length, the controller displaying the $1^{st}$ information a portion or whole part of a $2^{nd}$ region in response to the received input, the controller displaying a $2^{nd}$ information of the specific content different from the $1^{st}$ information on the $1^{st}$ region, the controller determining the amount of the $2^{nd}$ information depending on a size of the $2^{nd}$ region, a rollable display module configured to be initially rolled up, the rollable display module configured to display at least one of the $1^{st}$ information and the $2^{nd}$ information on the screen in accordance with a control command received from the controller, and an interface module configured to receive an input for adjusting a displayed screen length by unrolling the rollable display module from a user.

It is to be understood that both the foregoing general description and the following detailed description are exemplary and explanatory and are intended to provide further explanation of the invention as claimed.

Advantageous Effects of Invention

Accordingly, the present invention provides the following effects and/or features.

First of all, according to one embodiment of the present invention, critical information can be displayed on a screen in an initial state that a rollable display module is rolled and critical information and detailed information can be displayed on a screen in a state that the rollable display module is unrolled, whereby user convenience can be enhanced.

Secondly, according to another embodiment of the present invention, a $1^{st}$ information is displayed on a $1^{st}$ region using the property of a rollable display module and a $2^{nd}$ information and the $1^{st}$ information are displayed on the $1^{st}$ region and a portion or whole part of a $2^{nd}$ region in accordance with a screen length extension of the rollable display module, respectively, whereby information can be displayed differently to cope with a length variation according to unrolling a screen.

Thirdly, according to another embodiment of the present invention, user convenience can be enhanced in a manner of running a function of automatically scrolling a screen in response to a user's action of pulling out a rollable display module to the end.

Fourthly, according to another embodiment of the present invention, user convenience can be enhanced in a manner of switching a current message to a next message in response to a user's action of pulling out a rollable display module to the end and then releasing the rollable display module.

Fifthly, according to further embodiment of the present invention, user convenience can be enhanced in a manner that a current message is handled as read in response to a user's action of pulling out a rollable display module slightly and then releasing the rollable display module.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The present invention will become more fully understood from the detailed description given herein below and the accompanying drawings, which are given by illustration only, and thus are not limitative of the present invention, and wherein:

FIG. 1A is a block diagram to describe a mobile terminal related to the present disclosure;

FIGS. 1B and 1C are conceptual diagrams for one example of the mobile terminal related to the present invention, viewed from different directions;

FIG. 2 is a conceptual diagram of a deformable mobile terminal according to an alternative embodiment of the present disclosure;

FIG. 3 is a perspective diagram for one example of a watch type mobile terminal related to another embodiment of the present invention;

FIG. 4 is a perspective diagram for one example of a glass type mobile terminal related to further embodiment of the present invention.

FIG. 5 is a block diagram of a wearable device according to one embodiment of the present invention;

FIG. 6 is a flowchart of a method of controlling a wearable device according to one embodiment of the present invention;

FIG. 7 is a diagram to describe one example of when a rollable display module of a wearable device is extended, partitioning a screen into Region A and Region B according to one embodiment of the present invention;

FIG. 8 is a diagram of an inner configuration of a wearable device including a rollable display module according to one embodiment of the present invention;

FIG. 9 is a diagram to describe one example of when a screen is unrolled, partitioning the screen into Region A and Region B according to one embodiment of the present invention;

FIG. 10 is a diagram to describe one example of when a screen length of a rollable display module according to one embodiment of the present invention is extended, newly creating a $2^{nd}$ region, displaying a $1^{st}$ information and a $2^{nd}$ information on a screen to correspond to the newly created $2^{nd}$ region, and displaying a critical information and a detailed information on Region A and Region B, respectively;

FIG. 11 is a diagram to describe one example of when a screen length of a rollable display module according to one embodiment of the present invention is extended, newly creating a $2^{nd}$ region, displaying a $1^{st}$ information and a $2^{nd}$ information on a screen to correspond to the newly created $2^{nd}$ region, and displaying a critical information and a detailed information on Region A and Region B, respectively;

FIG. 12 is a diagram to describe one example of after a screen length has been extended in part, if a user swipes a screen with a finger, displaying a different region of a content currently displayed on a screen according to one embodiment of the present invention;

FIG. 13 is a diagram to describe one example of partitioning a screen into Region A and Region B in accordance with a content according to one embodiment of the present invention;

FIG. 14 is a diagram to describe one example that a message is handled as read in response to an action of pulling Region B slightly and then releasing it according to one embodiment of the present invention;

FIG. 15 is a diagram to describe one example of while a specific application is run, if Region B is swiped left to right, changing a tab menu of a specific content currently displayed on a screen according to one embodiment of the present invention;

FIG. 16 is a diagram to describe one example of running a search function according to one embodiment of the present invention;

FIG. 17 is a diagram to describe one example of if Region B is pulled to the end, running an auto scroll function or displaying a scroll bar on a screen according to one embodiment of the present invention;

FIG. 18 is a diagram to describe one example of switching a current message to a next message by pulling Region B to the end, minimizing Region B, and then pulling Region B again according to one embodiment of the present invention; and FIG. 19 is a diagram to describe one example of if a screen is increased by a specific length in response to an action of puling Region B, maintaining an overall length of a wearable device by decreasing a length of another portion of the wearable device by the specific length according to one embodiment of the present invention.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 includes components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1A is not a requirement, and that greater or fewer components may alternatively be implemented.

The wireless communication unit 110 may typically include at least one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes at least one or more modules which connect the mobile terminal 100 to at least one or more networks.

To facilitate such communications, the wireless communication unit 110 may include at least one of a broadcast receiving module 111, a mobile communication module 112, a wireless Internet module 113, a short-range communication module 114, and a location information module 115.

The input unit 120 may include a camera (or a video or image input unit) 121 for a video or image signal input, a microphone 122, which is one type of audio input device for inputting an audio signal, and a user input unit 123 (for example, a touch key, a push key (or, a mechanical key), etc.) for allowing a user to input information. Data (for example, audio, video, image, and the like) is obtained by the input unit 120 and may be analyzed and processed into a user's control command by controller 180.

The sensing unit 140 may be typically implemented using at least one or more sensors configured to sense internal information of the mobile terminal, the surrounding environment of the mobile terminal, user information, and the like. For example, the sensing unit 140 includes a proximity sensor 141 and an illumination sensor 142. If desired, the sensing unit 140 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize informations obtained from the sensing unit 140, and in particular, informations obtained from at least one or more sensors of the sensing unit 140, and combinations thereof.

The output unit 150 may be typically configured to output various types of information, such as audio, video, tactile output, and the like. The output unit 150 includes a display unit 151, an audio output unit (or module) 152, a haptic module 153, and an optical output unit (or module) 154. The display unit 151 may have an interlayered structure or an integrated structure with a touch sensor in order to embody a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or programs) executed or run in the mobile terminal 100, data or instructions (or commands) for operations of the mobile terminal 100, and the like. Some of these application programs may be downloaded from an external server via wireless communication. Other application programs may be installed within the mobile terminal 100 at the time of manufacturing or shipping, which is typically the case for basic functions of the mobile terminal 100 (for example, receiving a call, placing a call, receiving a message, sending a message, and the like). It is common for application programs to be stored or saved in the memory 170, installed on the mobile terminal 100, and executed by the controller 180 to perform an operation (or function) of the mobile terminal 100.

The controller 180 may typically functions to control overall operations of the mobile terminal 100, in addition to the operations associated with the application programs. The controller 180 may provide or process information or functions appropriate for a user by processing signals, data, information and the like, which are input or output by the various components mentioned in the foregoing description, or activating application programs stored in the memory 170.

Moreover, in order to execute or run the application program saved in the memory 170, the controller 180 can control some or all of the components illustrated in FIG. 1A. Furthermore, in order to execute or run the application program, the controller 180 may activate at least two of the components included in the mobile terminal 100 in a manner that the at least two components are combined together.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components mentioned in the foregoing description can operate cooperatively to implement operations, controls or controlling methods of the mobile terminal according to various embodiments mentioned in the following description. Moreover, the operations, controls and controlling methods of the mobile terminal may be implemented on the mobile terminal by running or executing at least one application program saved in the memory 170.

Prior to looking into various embodiments implemented through the mobile terminal 100, the above-mentioned components will now be described in more detail with reference to FIG. 1A as follows.

First of all, regarding the wireless communication unit 110, the broadcast receiving module 111 of the wireless communication unit 110 is typically configured to receive a broadcast signal and/or broadcast associated information from an external broadcast managing server via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing server may means a server which generates and transmits a broadcast signal and/or broadcast associated information, or a server which receives a pre-generated broadcast signal and/or broadcast associated information, and sends such items to the terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of the broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, the broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from at least one or more network entities. Typical examples of a network entity include a base station, an external terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signals transmitted and/or received via the mobile communication module 112 may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may be configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to at least one of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal 100 and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise interwork with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a location of the mobile terminal. As a representative example, the location information module 115 includes a Global Position System (GPS) module, a Wi-Fi module, or both. For instance, if utilizing a GPS (global positioning system) module, the mobile terminal can obtain a location of the mobile terminal using a signal sent by a GPS satellite. For another instance, if utilizing the Wi-Fi module, the mobile terminal can obtain its location based on information of a wireless AP (access point) configured to transmit or receive wireless signals to or from the Wi-Fi module. If desired, the location information module 115 may alternatively or additionally function with any of the other modules of the wireless communication unit 110 to obtain data related to the position of the mobile terminal. The location information module 115 may include a module to obtain a location (or a current location) of the mobile terminal and is non-limited to a module for directly calculating or obtaining a location of the mobile terminal.

The input unit 120 may be configured to permit various types of inputs to the mobile terminal 120. Examples of such inputs include image (or video) information (or signal), audio information (or signal), data, and user input. For the input of the image or video information, the mobile terminal 100 may include one or a plurality of cameras 121. Such cameras 121 may process image frames of still pictures or video obtained by image sensors in a video call mode or an image capture mode. The processed image frames can be displayed on the display unit 151 or stored in memory 170. In some cases, the cameras 121 provided to the mobile terminal 100 may be arranged in a matrix configuration to permit a plurality of images having various angles or focal points to be input to the mobile terminal 100. As another example, the cameras 121 may be disposed in a stereoscopic arrangement to acquire left and right images for implementing a stereoscopic image.

The microphone 122 processes an external sound signal into audio data. Such audio data can be variously utilized in accordance with a function (or application program) currently run in the mobile terminal 100. If desired, the microphone 122 may include assorted noise removing algorithms to remove unwanted noise generated in the course of receiving the external sound data.

The user input unit 123 is a component that permits input by a user. If information is inputted through the user input unit 123, the controller 180 can control an operation of the mobile terminal 100 to correspond to the inputted information. The user input unit 123 may include at least one of mechanical input means (for example, a mechanical key, a button disposed on a front and/or rear surface or a side surface of the mobile terminal 100, a dome switch, a jog wheel, a jog switch, and the like), or a touch-sensitive input means, among others. As one example, the touch-sensitive input means may be a virtual key, a soft key, or a visual key, which is displayed on a touchscreen through software processing, or a touch key which is disposed on the mobile terminal 100 at a location that is other than the touchscreen. On the other hand, the virtual key or the visual key may be displayed on the touchscreen in various shapes, for example, graphic, text, icon, video, or a combination thereof.

Meanwhile, the sensing unit 140 is generally configured to sense at least one of internal information of the mobile terminal, surrounding environment information of the mobile terminal, user information, and the like and then generates a sensing corresponding to the sensed information. Based on the sensing signal, the controller 180 generally cooperates with the sending unit 140 to control operation of the mobile terminal 100 or execute data processing, a function or an operation associated with an application program installed on the mobile terminal. The sensing unit 140 may be implemented using any of a variety of representative sensors, some of which will now be described in more detail as follows.

First of all, the proximity sensor 141 may include a sensor to sense a presence or absence of an object approaching a surface, or an object disposed near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

For clarity of the following description, the term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense a proximity touch, and proximity touch patterns (for example, distance, direction, speed, time, position, moving status, and the like). In general, controller 180 processes data corresponding to proximity touches and proximity touch patterns sensed by the proximity sensor 141, and causes output of visual information through the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, and the like.

When a touch input is sensed by a touch sensor, corresponding signal(s) may be transmitted to a touch controller. The touch controller may process the received signal(s), and then transmit corresponding data to the controller 180. Accordingly, the controller 180 may sense which region of the display unit 151 has been touched. Here, the touch controller may be one of a component separate from the controller 180, the controller 180 itself, and combinations thereof.

In some embodiments, the controller 180 may execute the same or different controls according to a type of a touch object that touches the touchscreen or a touch key provided in addition to the touchscreen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a sensing target using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 is described as one component of the input unit 120 and typically includes at least one of a camera sensor (CCD, CMOS etc.), a photo sensor (or image sensors), and a laser sensor.

Implementing the camera 121 with a laser sensor may allow detection of a touch to a sensing target with respect to a 3D stereoscopic image. The photo sensor may be laminated on, or overlapped with, the display device. The photo sensor may be configured to scan movement of the sensing target in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the sensing target according to variation of light to thus obtain position information of the sensing target.

The display unit 151 is generally configured to display (or output) information processed in the mobile terminal 100. For example, the display unit 151 may display a running screen information of an application program run on the mobile terminal 100, a user interface (UI) information in response to the running screen information, and/or a graphic user interface (GUI) information in response to the running screen information.

In some embodiments, the display unit 151 may be implemented as a stereoscopic display unit for displaying stereoscopic images.

A typical stereoscopic display unit may employ a stereoscopic display scheme such as a stereoscopic scheme (glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output unit 152 is generally configured to output audio data. Such audio data may be obtained from any of a number of different sources, such that the audio data may be received from the wireless communication unit 110 or may have been stored in the memory 170. The audio data may be output during modes such as a call signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also include a receiver, a speaker, a buzzer, and/or the like.

A haptic module 153 can be configured to generate various tactile effects that can be sensed by a user. A typical example of a tactile effect generated by the haptic module 153 is vibration. The strength, pattern and the like of the vibration generated by the haptic module 153 can be controlled by a user's selection or a setting of the controller. For example, the haptic module 153 may combine and output different vibrations together or may output different vibrations in a sequential manner.

As well as the vibration, the haptic module 153 can generate various other tactile effects, including an effect by stimulation such as a pin arrangement moving vertically to a contacted skin surface, a spray or suction force of air through a jet orifice or a suction opening, a touch to a skin surface, a contact of an electrode, an electrostatic force, an effect by reproducing the cold/warm sense using an endothermic or exothermic element, and the like.

The haptic module 153 can also be implemented to allow the user to feel a tactile effect through a muscle sensation such as the user's fingers or arm, as well as to transfer the tactile effect through direct contact. Two or more haptic modules 153 may be provided according to a configuration type of the mobile terminal 100.

An optical output unit 154 can output a signal for indicating an event occurrence using light of a light source. Examples of events occurring in the mobile terminal 100 may include a message reception, a call signal reception, a missed call, an alarm, a schedule notification, an email reception, an information reception through an application, and the like.

A signal output by the optical output unit 154 may be implemented in such a manner that the mobile terminal emits monochromatic light or light with a plurality of colors. The signal output may be terminated as the mobile terminal senses that a user has checked the event for example.

The interface unit 160 serves as an interface for all external devices connected to the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired/wireless headset ports, external power supply ports, wired/wireless data ports, memory card ports, ports for connecting a device having an identification module, audio input/output (I/O) ports, video I/O ports, earphone ports, and/or the like.

The identification module may include a chip configured to store various informations for authenticating authority in using the mobile terminal 100 and may include a user identity module (UIM), a subscriber identity module (SIM), a universal subscriber identity module (USIM), and the like. In addition, the device having the identification module (also referred to herein as an "identifying device") may be manufactured in the form of a smart card. Hence, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals inputted by the user from the cradle to be transferred to the mobile terminal therethrough. Various command signals or the power inputted from the cradle may operate as signals for recognizing that the mobile terminal is properly mounted on the cradle.

The memory 170 can store programs to support operations of the controller 180 and may temporarily store input/output data (for example, phonebook, messages, still images, videos, etc.). The memory 170 may store data related to various patterns of vibrations and audio that are outputted in response to touch inputs to the touchscreen.

The memory 170 may include at least one of types of storage mediums including a flash memory, a hard disk, a solid state disk, a silicon disk, a multimedia card micro type, a card-type memory (e.g., SD memory, XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also operate in relation to a web storage device that performs the storage function of the memory 170 on Internet.

As mentioned in the foregoing description, the controller 180 controls operations related to the application programs and may typically controls overall operations of the mobile terminal 100. For example, the controller 180 may set or release a lock state for restricting a user from inputting a control command with respect to applications if a status of the mobile terminal meets a preset condition.

The controller 180 may perform the controlling and processing associated with voice calls, data communications, video calls, and the like, or may perform pattern recognition processing to recognize a handwriting input or a picture drawing input performed on the touchscreen as characters or images, respectively. In addition, the controller 180 can control one or a combination of those components mentioned in the foregoing description in order to implement various embodiments mentioned in the following description.

The power supply unit 190 receives an external or internal power under the control of the controller 180 and then supplies the power required for operating the respective elements and components. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In doing so, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIG. 1B and FIG. 1C, the mobile terminal 100 shown in the drawings includes a bar-type terminal body, by which the present invention is non-limited. The present invention is applicable to various configurations such as a watch type, a clip type, a glasses type and the like. And, the present invention is also applicable to such configurations, in which at least two bodies are combined together in a manner of being relatively movable, as a folder type, a flip type, a slide type, a swing type, a swivel type and the like. Discussion herein will often relate to a particular type of a mobile terminal. Yet, such teachings with regard to a particular type of a mobile terminal will generally apply to other types of mobile terminals as well.

In this case, the terminal body may be appreciated as a concept of regarding the mobile terminal 100 as at least one assembly.

The mobile terminal 100 may generally include a case (for example, frame, housing, cover, and the like) forming the appearance of the terminal. According to this embodiment, as shown in the drawing, the case may include a front case 101 and a rear case 102. Various electronic components are disposed in a space provided by coupling the front case 101 and the rear case 102 together. At least one middle case may be additionally disposed between the front case 101 and the rear case 102.

The display unit 151 is disposed on the front side of the terminal body to output information. As illustrated, a window 151*a* of the display unit 151 may be mounted on the front case 101 to form the front surface of the terminal body together with the front case 101.

In some cases, electronic components may also be mounted on the rear case 102. Examples of such electronic components mountable on the rear case 102 may include a detachable battery 191, an identification module, a memory card, and the like. A rear cover 103 is configured to cover the electronic components, and this cover may be detachably coupled to the rear case 102. Therefore, if the rear cover 103 is detached from the rear case 102, the electronic components mounted on the rear case 102 are externally exposed.

As illustrated, if the rear cover 103 is coupled to the rear case 102, a lateral surface of the rear case 102 may be partially exposed. In some cases, upon the coupling, the rear case 102 may also be completely shielded by the rear cover 103. In some embodiments, the rear cover 103 may include an opening for externally exposing a camera 121*b* or an audio output unit 152*b*.

The cases 101, 102 and 103 may be formed by injection-molding synthetic resin or may be formed of a metal, for example, stainless steel (STS), aluminum (Al), titanium (Ti), or the like.

As an alternative to the example in which a plurality of the cases form an inner space for accommodating various electronic components, the mobile terminal 100 may be configured such that a single case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is disposed between the window 151*a* and the front case 101, between the front case 101 and the rear case 102, or between the rear case 102 and the rear cover 103, to hermetically seal an inner space when those cases are coupled.

The mobile terminal 100 may include a $1^{st}$ audio output unit 152*a*, a $2^{nd}$ audio output unit 152*b*, a proximity sensor 141, an illumination sensor 142, an optical output unit 154, a $1^{st}$ camera 121*a*, a $2^{nd}$ camera 121*b*, a $1^{st}$ manipulation unit 123*a*, a $2^{nd}$ manipulation unit 123*b*, a microphone 122, an interface unit 160 and the like.

For the following description, as shown in FIG. 1B and FIG. 1C, the mobile terminal 100 having the following dispositions is taken as one example. First of all, the display unit 151, the $1^{st}$ audio output unit 152*a*, the proximity sensor 141, the illumination sensor 142, the optical output unit 154, the $1^{st}$ camera 121*a* and the $1^{st}$ manipulation unit 123*a* are disposed on a front side of the terminal body. Secondly, the $2^{nd}$ manipulation unit 123*b*, the microphone 122 and the interface unit 160 are disposed on a lateral side of the terminal body. Thirdly, the $2^{nd}$ audio output unit 152*b* and the $2^{nd}$ camera 121*b* are disposed on a rear side of the terminal body.

Yet, it is to be understood that alternative dispositions are possible within the teachings of the instant disclosure. Some components may be omitted, replaced, or disposed on another side. For example, the $1^{st}$ manipulation unit 123*a* may be provided to the front side of the terminal body, and the $2^{nd}$ audio output unit 152*b* may be provided not to the rear side of the terminal body but to the lateral side of the terminal body.

The display unit 151 displays or outputs information processed in the mobile terminal 100. For example, the display unit 151 may display a running screen information of an application program run on the mobile terminal 100, a user interface (UI) information in response to the running screen information, and/or a graphic user interface (GUI) information in response to the running screen information.

The display unit 151 may be implemented using at least one of suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using at least two display devices, which can implement the same or different display technology. For instance, a plurality of the display devices may be disposed on one side in a manner of being spaced apart from each other or being integrated, or these devices may be disposed on different sides, respectively.

The display unit 151 may also include a touch sensor which senses a touch input to the display unit 151 in order to receive an input of a control command by a touch mechanism. If a touch is applied to the display unit 151, the touch sensor senses the touch and the controller 180 may generate a control command or other signals corresponding to the touch. The content inputted by the touch mechanism may include a text, a numeral, or a menu item which can be indicated or designated in various modes.

The touch sensor may be configured in a form of a film having a touch pattern, disposed between the window 151a and a display (not shown in the drawing) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

Thus, the display unit 151 may also form a touchscreen together with the touch sensor. Here, the touchscreen may serve as the user input unit 123 (see FIG. 1A). In some cases, therefore, the touchscreen may replace at least some of the functions of the $1^{st}$ manipulation unit 123a.

The $1^{st}$ audio output unit 152a may be implemented in the form of a receiver configured to deliver a call sound to a user's ear, while the $2^{nd}$ audio output unit 152 may be implemented in the form of a loud speaker configured to output various alarm sounds, a multimedia play sound, and the like.

The window 151a of the display unit 151 will typically include a sound hole to discharge the sound generated from the $1^{st}$ audio output unit 152a, by which the present invention is non-limited. Alternatively, the sound can be discharged through an assembly gap between the structural bodies (for example, a gap between the window 151a and the front case 101, etc.). In this case, a hole independently formed to output audio sounds may not be seen externally or is otherwise hidden in terms of appearance, thereby further simplifying the appearance of the mobile terminal 100.

The optical output unit 154 can be configured to output light for indicating an occurrence of an event. Examples of such an event include a message reception, a call signal reception, a missed call, an alarm, a schedule notification, an email reception, an information reception through an application, and the like. If it is detected that a user has confirmed the event, the controller 180 can control the optical output unit 154 to stop outputting the light.

The $1^{st}$ camera 121a can process image frames of still images or video obtained by the image sensor in shot mode or video call mode. The processed image frames can be displayed on the display unit 151 or saved in the memory 170.

The $1^{st}$ and $2^{nd}$ manipulation units 123a and 123b are examples of the user input unit 123 manipulated by a user to receive an input of a command for controlling an operation of the mobile terminal 100, may be commonly referred to as a manipulating portion as well, and may employ any tactile methods that allow the user to perform manipulation such as a touch, a push, a scroll, or the like by experiencing a tactile sense. The $1^{st}$ and $2^{nd}$ manipulation units 123a and 123b may also employ any nontactile methods that allow the user to perform manipulation such as a proximity touch, a hovering touch, or the like by experiencing no tactile sense.

In the present drawing, the $1^{st}$ manipulation unit 123a is depicted as a touch key, by which the present invention is non-limited. For example, the $1^{st}$ manipulation unit 123a may include a push key or a combination of a touch key and a push key.

A variety of contents inputted through the $1^{st}$ and $2^{nd}$ manipulation units 123a and 123b can be set. For example, the $1^{st}$ manipulation unit 123a may receive an input of a command such as menu, home key, cancel, search, or the like, and the $2^{nd}$ manipulation unit 123b may receive an input of a command such as a volume level control of a sound outputted from the $1^{st}/2^{nd}$ audio output unit 152a/152b, a switch to a touch recognition mode of the display unit 151, or the like.

As another example of the user input unit 123, a rear input unit (not shown in the drawing) may be provided to the rear surface of the terminal body. The rear input unit can be manipulated to receive an input of a command for controlling an operation of the mobile terminal 100. And, contents of the input can be set variously. For example, the rear input unit can receive an input of a command such as power on/off, start, end, scroll, a volume level adjustment of sound outputted from the $1^{st}/2^{nd}$ audio output unit 152a/or 152b, a switch to a touch recognition mode of the display unit 151, or the like. The rear input unit may be configured to enable a touch input, a push input, or a combination thereof.

The rear input unit may be disposed to overlap the display unit 151 of the front side in a thickness direction of the terminal body. As one example, the rear input unit may be disposed on an upper end portion of the rear side of the terminal body such that a user can easily manipulate it using a forefinger on grabbing the terminal body with one hand, by which the present invention is non-limited. Alternatively, a location of the rear input unit can be changed.

Thus, in case that the rear input unit is provided to the rear side of the terminal body, it is able to embody a user interface of a new type using the rear input unit. Moreover, as the touchscreen or the rear input unit mentioned in the foregoing description replaces at least one function of the $1^{st}$ manipulation unit 123a provided to the front side of the terminal body, if the $1^{st}$ manipulation unit 123a is not disposed on the front side of the terminal body, the display unit 151 can configure a wider screen.

Meanwhile, the mobile terminal 100 may include a fingerprint recognition sensor configured to scan a user's fingerprint. The controller 180 can use a fingerprint information sensed through the fingerprint recognition sensor as an authentication means. The fingerprint recognition sensor may be installed in the display unit 151 or the user input unit 123.

The microphone 122 is configured to receive inputs of a user's voice and other sounds. The microphone 122 is provided to a plurality of spots and configured to receive an input of stereo sound.

The interface unit 160 may serve as a passage for connecting the mobile terminal 100 to an external device. For example, the interface unit 160 may include at least one of a connection terminal for connecting to another device (for example, an earphone, an external speaker, etc.), a port for near field communication (for example, an Infrared Data Association (IrDA) port, a Bluetooth port, a wireless LAN port, etc.), and a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The $2^{nd}$ camera 121b may be disposed at the rear side of the terminal body and have an image capturing direction substantially opposite to that of the $1^{st}$ camera unit 121a.

The $2^{nd}$ camera 121b may include a plurality of lenses arranged along at least one line. A plurality of the lenses may be arranged in a matrix form. The cameras may be named "array camera." In case that the $2^{nd}$ camera 121b is configured with an array camera, images can be taken in various manners using a plurality of the lenses and images of better quality can be obtained.

A flash 124 may be disposed adjacent to the $2^{nd}$ camera 121b. When an image of a subject is taken using the $2^{nd}$ camera 121b, the flash 124 may apply light toward the subject.

The $2^{nd}$ audio output unit 152b may be additionally disposed on the terminal body. The $2^{nd}$ audio output unit 152b may implement stereophonic sound functions in conjunction with the $1^{st}$ audio output unit 152a, and may be also used in implementing a speaker phone mode for call communication.

At least one antenna for wireless communication may be provided to the terminal body. The antenna may be installed in the terminal body or formed at the case. For example, an antenna configuring a part of the broadcast receiving module 111 (cf. FIG. 1A) may be configured retractable into the terminal body. Alternatively, an antenna of a film type is formed and attached to an inner surface of the rear cover 103. Alternatively, a case containing a conductive material may be configured to function as an antenna.

A battery 191 may be configured to receive power via a power source cable connected to the interface unit 160. Also, the battery 191 may be configured to be recharged by wireless through a wireless charger. Wireless charging may be implemented by magnetic induction or resonance (e.g., electromagnetic resonance).

According to the example shown in the present drawing, the rear cover 103 is coupled to the rear case 102 to cover the battery 191. Hence, it is able to restrict separation of the battery 191 and to protect the battery 191 from an external impact or particles. In case that the battery 191 is configured detachable from the terminal body, the rear case 103 may be detachably coupled to the rear case 102.

An accessory for protecting an appearance or assisting/expanding the functions of the mobile terminal 100 can be added to the mobile terminal 100. As one example of an accessory, a cover or pouch for covering or accommodating at least one surface of the mobile terminal 100 may be provided. The cover or pouch may cooperate with the display unit 151 to expand the functions of the mobile terminal 100. Another example of the accessory is a touch pen for assisting or expanding touch inputs to the touchscreen.

Meanwhile, according to the present invention, it is able to display information processed by the mobile terminal using a flexible display.

FIG. 2 is a conceptual view to describe another example of a deformable mobile terminal according to the present invention.

Referring to FIG. 2, a display unit 251 may be configured deformable in response to an external force. This deformation may include at last one of curving, bending, folding, twisting, rolling, and combinations thereof. The deformable display unit 251 may be named "flexible display unit?. In particular, the flexible display unit 251 may include a general flexible display, an electronic paper (also known as e-paper), and a combination thereof. In general, a mobile terminal 200 may be configured to include the same or similar features of the former mobile terminal 100 shown in FIGS. 1A to 1C.

Generally, a flexible display means a display that is light-weighted and non-fragile in a manner of being fabricated on a thin and flexible substrate having such properties of paper as curving, bending, folding, twisting, and rolling while maintaining the properties of an existing flat panel display.

The e-paper may be used to refer to a display technology that employs the properties of a general ink. The e-paper is different from the existing flat panel display in using reflective light. The e-paper is generally understood as changing displayed information by electrophoresis using twist balls or capsules.

In a state that the flexible display unit 251 is not deformed (for example, a state that the flexible display unit 251 has an infinite radius of curvature, referred to as a $1^{st}$ state), a display region of the flexible display unit 251 becomes a flat surface. In a state that the flexible display unit 251 is deformed from the $1^{st}$ state by an external force (for example, a state that the flexible display unit 251 has a finite radius of curvature, referred to as a $2^{nd}$ state), the display region may become a curved surface or a bent surface. As illustrated, information displayed in the second state may include a visual information outputted through the curved surface. The visual information may be implemented in a manner that light emission of each unit pixel (sub-pixel) arranged in a matrix configuration is controlled independently. In this case, the unit pixel denotes an elementary unit for representing a single color.

The flexible display unit 251 may enter not a flat state but a curved state (for example, a vertically curved state, a horizontally curved state, etc.) in the $1^{st}$ state. In doing so, if an external force is applied to the flexible display unit 251, the flexible display unit 251 may be deformed into a flat state (or a less curved state) or a more curved state.

If desired, the flexible display unit 251 may embody a flexible touchscreen by being combined with a touch sensor. If a touch is applied to the flexible touchscreen, the controller 180 (cf. FIG. 1A) can perform a control in response to the touch input. The flexible touchscreen may be configured to sense a touch input not only in the $1^{st}$ state but also in the $2^{nd}$ state.

Meanwhile, the mobile terminal 200 according to the modified example may include a deformation sensing means for sensing the deformation of the flexible display unit 251. The deformation sensing means may be included in the sensing unit 140 shown in FIG. 1A.

The deformation sensing means is provided to the flexible display unit 251 or the case 201 to sense information related to the deformation of the flexible display unit 251. Examples of such information related to the deformation of the flexible display unit 251 may include a deformed direction of the flexible display unit 251, a deformed degree of the flexible display unit 251, a deformed position of the flexible display unit 251, a deformed time of the flexible display unit 251, an acceleration for restoring the deformed flexible display unit 251, and the like. Besides, the information may include various kinds of information that can be sensed owing to the curving of the flexible display unit 251.

The controller 180 can change the information displayed on the flexible display unit 251 or generate a control signal for controlling a function of the mobile terminal 200, based on the information related to the deformation of the flexible display unit 251. Such information is typically sensed by the deformation sensing means.

The mobile terminal 200 according to the modified example may include a case 201 for accommodating the flexible display unit 251. The case 201 can be configured deformable together with the flexible display unit 251 in consideration of the property of the flexible display unit 251.

A battery (not shown in the drawing) provided to the mobile terminal 200 may be configured deformable by an external force together with the flexible display unit 251 in consideration of the property of the flexible display unit 251. In order to embody such a battery, it is able to employ a stack and folding scheme of stacking battery cells on each other.

The state deformation of the flexible display unit 251 is non-limited by the case of applying the external force. For example, the flexible display unit 251 can be deformed into the $2^{nd}$ state in response a command given by a user or application when the flexible display unit 251 is in the $1^{st}$ state.

Beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

First of all, a typical wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a $1^{st}$ case 301a and a $2^{nd}$ case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the $1^{st}$ case 301a to form a front surface of the terminal body together with the $1^{st}$ case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

FIG. 4 is a perspective diagram for one example of a glass type mobile terminal related to further embodiment of the present invention.

Referring to FIG. 4, the glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit of the mobile terminal 400 includes a $1^{st}$ frame 401 and a $2^{nd}$ frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) by overlaying a virtual image on a real image or a background using the property of the display.

The camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the preset drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

A communication system that can be embodied through the mobile terminal 100 according to the present invention is described in detail as follows.

First of all, a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

For clarity, the following description is limited to CDMA only. Yet, it is apparent that the present invention applies equally to other system types including not only CDMA wireless communication system but also OFDM (Orthogonal Frequency Division Multiplexing) wireless communication system.

The CDMA wireless communication system generally includes at least one terminal 100, at least one base station (BS) (possibly named Node B or Evolved Node B), at least one or more base station controllers (BSCs), and a mobile switching center (MSC). The MSC is configured to be connected to a conventional Public Switched Telephone Network (PSTN) and the BSCs. The BSCs are coupled to the base stations to pair with via backhaul line. The backhaul line may be provided in accordance with at least one of E1/T1, ATM, IP, PPP, Frame Relay, HDSL, ADSL, and xDSL. Hence, a plurality of BSCs can be included in the CDMA wireless communication system.

Each of a plurality of BSs (base stations) may include at least one or more sectors. And, each of the sectors may include an omni-directional antenna or an antenna indicating a specific direction radially away from the BS. Alternatively, each of the sectors may include two or more antennas of various types. Each of the BSs may be configured to support a plurality of frequency assignments. And, each of a plurality of the frequency assignments may have a specific spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In this case, the term "base station" may be used to refer collectively to one BSC and at least one BS. The base stations may indicate "cell site." Moreover, each of a plurality of sectors for a specific BS may be referred to as a plurality of cell sites.

A broadcasting transmitter (BT) transmits a broadcast signal to the mobile terminals 100 operating within the system. The broadcast receiving module 111 shown in FIG. 1A is typically configured inside the mobile terminal 100 to receive broadcast signals transmitted by the BT.

Moreover, Global Positioning System (GPS) for locating the position of the mobile terminal 100 may cooperate with the CDMA wireless communication system. The satellite 300 helps to obtain a location of the mobile terminal 100. Useful position information may be obtained with greater or fewer satellites than two. In doing so, it is able to trace a location of the mobile terminal 100 using all technologies capable of tracing locations or positions as well as the GPS tracking technology. If desired, at least one of the GPS satellites may be in charge of satellite DMB transmissions optionally or additionally.

The location information module 115 provided to the mobile terminal is generally configured to detect, calculate, or otherwise identify a position or location of the mobile terminal. As a representative example, the location information module 115 may include a Global Position System (GPS) module, a Wi-Fi (wireless fidelity) module, or both. If desired, the location information module 115 may alternatively or additionally function as any of the other modules of the wireless communication unit 110 to obtain data related to the position or location of the mobile terminal.

The GPS module 115 accurately calculates a current 3D location information according to latitude, longitude and latitude by measuring an accurate time and distance from three or more satellites and then applying trigonometry to the calculated informations. Currently, a method of acquiring distance and time information from three satellites and performing error correction with a single satellite is popularly used. Moreover, the GPS module 115 can acquire speed information by continuing to calculate a real-time current location. Yet, accuracy of a measured location or position of the mobile terminal may be compromised when the mobile terminal is located in such a blind spot of satellite signals as an indoor space or the like. In order to compensate the measured location by GPS system, it is able to use Wi-Fi Positioning System (WPS) and the like.

The Wi-Fi positioning system (WPS) is the location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal 100, a wireless access point (AP) connected to the mobile terminal 100, and a database storing random wireless AP information.

The mobile terminal 100 currently connected to the wireless AP may send a location information request message to the Wi-Fi location determination server.

The Wi-Fi location determination server extracts the information of the wireless AP connected to the mobile terminal 100, based on the location information request message (or signal) of the mobile terminal 100. The information of the wireless AP connected to the mobile terminal 100 may be sent to the Wi-Fi location determination server through the mobile terminal 100, or sent to the Wi-Fi location determination server from the wireless AP.

The information of the wireless AP extracted based on the location information request message of the mobile terminal 100 may include at least one of media access control (MAC) address, service set identification (SSID), received signal strength indicator (RSSI), reference signal received Power (RSRP), reference signal received quality (RSRQ), channel information, privacy, network type, signal strength, noise strength, and the like.

As mentioned in the above description, the Wi-Fi location determination server receives the information of the wireless AP connected to the mobile terminal 100 and may be then able to extract wireless AP information corresponding to the wireless AP connected to the mobile terminal from the pre-established database. In this case, the information of any wireless APs stored in the database may include information such as MAC address, SSID, RSSI, channel information, privacy, network type, latitude and longitude coordinate, building at which the wireless AP is located, floor number, detailed indoor location information (GPS coordinates available), AP owner's address, phone number, and the like. In doing so, in order to remove a mobile AP or a wireless AP provided using an illegal MAC address in the course of a location determining process, the Wi-Fi location determination server may extract only a prescribed number of wireless AP informations in order of high RSSI.

Thereafter, the Wi-Fi location determination server may extract (analyze) location information of the mobile terminal 100 using at least one wireless AP information extracted from the database. By comparing the included information and the received wireless AP information to each other, the location information of the mobile terminal 100 is extracted (or analyzed).

As a method for extracting (or analyzing) the location information of the mobile terminal 100, it is able to utilize a Cell-ID scheme, a fingerprint scheme, a trigonometry scheme, a landmark scheme and the like.

The Cell-ID scheme is used to determine a location of a wireless AP having the largest signal strength among peripheral wireless AP informations collected by a mobile terminal as a location of the mobile terminal. The Cell-ID scheme has advantages as follows. First of app, Implementation of the Cell-ID scheme is minimally complicated. Secondly, the Cell-ID scheme does not require additional costs. Thirdly, location information can be rapidly acquired. Yet, the Cell-ID scheme has the disadvantage in that the precision of positioning may fall below a desired threshold when the installation density of wireless APs is low.

The fingerprint scheme is a method of estimating a location through a signal strength information transmitted by a mobile terminal based on information collected by selecting a reference location from a service area. In order to use the fingerprint scheme, it is necessary to establish database of propagation characteristics in advance.

The trigonometry scheme is used to calculate a location of a mobile terminal based on a distance between coordinates of at least three wireless APs and the mobile terminal. In order to measure the distances between the mobile terminal and the wireless APs, signal strength may be converted into distance information, or Time of Arrival (ToA), Time Difference of Arrival (TDoA), Angle of Arrival (AoA) and the like may be used.

The landmark scheme is used to measure a location or position of a mobile terminal using a known landmark transmitter.

In addition to the above-listed schemes, various algorithms may be used to extract (or analyze) location information of a mobile terminal.

Such extracted location information may be transmitted to the mobile terminal 100 through the Wi-Fi location determination server, whereby the mobile terminal can acquire the location information.

The mobile terminal 100 can acquire location information by being connected to at least one wireless AP. In doing so, the number of wireless APs required for acquiring the location information of the mobile terminal 100 may be variously changeable depending on a wireless communication environment in which the mobile terminal 100 is situated.

As mentioned in the foregoing description with reference to FIG. 1A, short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus) and the like may apply to the mobile terminal according to the present invention.

Among the short-range communication technologies, NFC module provided to the mobile terminal supports an inter-terminal non-contact type short-range wireless communication in a distance of about 10 cm range. The NFC module may operate in one of a card mode, a reader mode and a P2P mode. The mobile terminal 100 may further include a security module for storing card information in order to for the NFC module in the card mode. In this case, the security module may include one of a physical medium such as Universal Integrated Circuit Card (UICC) (e.g., Subscriber Identification Module (SIM), Universal SIM (USIM), etc.), Secure micro SD, a sticker and the like, or a logical medium (e.g., embedded Secure Element (SE), etc.) embedded in the mobile terminal. Data exchange may be performed between the NFC module and the security module based on Single Wire Protocol (SWP).

In a case that the NFC module operates in the card mode, the mobile terminal may externally transfer card information saved like a traditional IC card.

In particular, if a mobile terminal storing card information of a payment card (e.g., a credit card, a bus card, etc.) approaches a card reader, a short-range mobile payment may be processed. If a mobile terminal storing card information of an entrance card approaches an entrance card reader, an entrance approval procedure may start. A card such as a credit card, a traffic card, or an entrance card may be loaded on the security module in the form of applet, and the security module may store card information on the loaded card.

In this case, the card information of the payment card may include at least one of a card number, a remaining amount, a use history, and the like. The card information of the entrance card may include at least one of a user's name, a user's number (e.g., a user's student number, a user's staff number, etc.), an entrance history, and the like.

In case that the NFC module operates in the reader mode, the mobile terminal can read data from an external tag. In doing so, the data received from the external tag by the mobile terminal may be coded in NFC Data Exchange Format defined by NFC Forum. And, the NFC Forum generally defines four record types. In particular, the NFC Forum defines four Record Type Definitions (RTDs) such as Smart Poster, Text, Uniform Resource Identifier (URI), General Control and the like. If the data received from the external tag is a smart poster type, the controller can run a browser (e.g., Internet browser, etc.). If the data received from the external tag is a text type, the controller can run a text viewer. If the data received from the external tag is a URI type, the controller can run a browser or make a phone call. If the data received from the external tag is a general control type, the controller can execute an accurate operation in accordance with control contents.

In case that the NFC module operates in the P2P (Peer-to-Peer) mode, the mobile terminal can perform P2P communication with another mobile terminal. In this case, Logical Link Control Protocol (LLCP) can apply to the P2P communication. For the P2P communication, connection may be created between one mobile terminal and another mobile terminal. In this case, the connection may be categorized into a connectionless mode terminated after switching a single packet or a connection-oriented mode for exchanging packets consecutively. Through the P2P communication, data such as an electronic type business card, a contact information, a digital photo, a URL and the like, setup parameters for Bluetooth connection, Wi-Fi connection, etc. can be exchanged. Yet, the P2P mode can be effectively utilized in exchanging data in small size because an available distance for the NFC communication is relatively short.

Embodiments related to a controlling method implemented in the above-configured mobile terminal shall be described in more detail with reference to the accompanying drawings. It is understood by those skilled in the art that the present features can be embodied in several forms without departing from the characteristics thereof.

Although the present specification is described by taking the mobile terminal 100 shown in FIGS. 1A to 1C as one example, it is a matter of course that embodiments of the present invention are applicable to the mobile terminals 200, 300 and 400 described with reference to FIGS. 2 to 4.

FIG. 5 is a block diagram of a wearable device according to one embodiment of the present invention.

Referring to FIG. 5, a wearable device includes an interface module 510, a controller 520, a rollable display module 530, a memory 540 and a transparent glass window 550.

The interface module 510 receives an input for adjusting a displayed screen length by unrolling the rollable display module 530 from a user.

The controller 520 displays a $1^{st}$ information of a specific content on a $1^{st}$ region of a screen, displays the $1^{st}$ information on a portion or whole part of a $2^{nd}$ region to correspond to the received input, displays a $2^{nd}$ information, which is different from the $1^{st}$ information, of the specific content on the $1^{st}$ region, and determines an amount of the $2^{nd}$ information depending on a size of the $2^{nd}$ region.

In this case, each of the $1^{st}$ information and the $2^{nd}$ information may include at least one of a text based information and an image based information. In particular, the $2^{nd}$ information is a detailed information of the $1^{st}$ information.

After a screen length has been increased by a prescribed length, if a touch input applied from a $1^{st}$ point on the screen to a $2^{nd}$ point different from the $1^{st}$ point is received from a user, the controller 520 displays a region different from a specific region of a specific content currently displayed on the screen in response to the touch input.

The corresponding details shall be described with reference to FIG. 12 later.

While a specific application is run, if a screen length is increased by a prescribed length and an input of minimizing a screen length is then received within a prescribed time, the controller 520 controls a message, which is related to a specific content currently displayed on the screen, to be displayed on the screen.

The corresponding details shall be described with reference to FIG. 14 later.

While a specific application is run, if a screen length is increased by a prescribed length, an extended screen is fixed, and a touch input applied in a specific direction from a $1^{st}$ point on the screen to a $2^{nd}$ point different from the $1^{st}$ point is then received from a user within a prescribed time, the controller 520 changes a tab menu of a specific content currently displayed on the screen and displays a content corresponding to the changed tab menu on the screen.

The corresponding details shall be described with reference to FIG. 15 later.

While a specific application is run, if a screen length is increased by a prescribed length and an input of touching a screen is then received from a user, the controller 520 displays a keypad for inputting a text on the screen. If a voice is received from a user, the controller 520 searches for a search word corresponding to the received voice.

The corresponding details shall be described with reference to FIG. 16 later.

If a screen length is maximum, the controller 520 scrolls a screen automatically.

If a screen length is maximum, the controller 520 controls a scroll bar movable on a screen to be displayed on a specific region of the screen.

The corresponding details shall be described with reference to FIG. 17 later.

If a screen length is increased to the maximum and an input of minimizing the screen length is then received from a user within a prescribed time, the controller 520 controls a $2^{nd}$ content, which is different from a $1^{st}$ content corresponding to a specific content currently displayed on a screen, to be displayed on the screen.

The corresponding details shall be described with reference to FIG. 18 later.

If a screen length is changed, the controller 520 controls a length of a different portion of the wearable device to be changed into the changed screen length in response to the changed screen length.

The corresponding details shall be described with reference to FIG. 19 later.

The rollable display module 530 is initialized into a rolled-up state and displays at least one of the $1^{st}$ information and the $2^{nd}$ information on the screen in response to the control command received from the controller 520.

The memory 540 stores various job contents performed by the controller 520.

The transparent glass window 550 is mounted on a top portion of one end of the rollable display module 530.

The corresponding details shall be described with reference to FIG. 8 later.

FIG. 6 is a flowchart of a method of controlling a wearable device according to one embodiment of the present invention. The present invention is implemented by the controller 520.

Referring to FIG. 6, first of all, a $1^{st}$ information of a specific content is displayed on a $1^{st}$ region of a screen [S610].

When the rollable display module is in rolled-up state, an input for adjusting a screen length by unrolling the rollable display module for displaying the screen is received from a user [S620].

In response to the received input, a $1^{st}$ information is displayed on a portion or whole part of a $2^{nd}$ region [S630].

A $2^{nd}$ information, which is different from the $1^{st}$ information, of the specific content is displayed on the $1^{st}$ region [S640].

In this case, the controller 520 determines the amount of the $2^{nd}$ information depending on a size of the $2^{nd}$ region.

FIG. 7 is a diagram to describe one example of when a rollable display module of a wearable device is extended, partitioning a screen into Region A and Region B according to one embodiment of the present invention.

Referring to FIG. 7, AS the rollable display module 530 of the wearable device 500 is extended, a screen is partitioned into Region A and Region B.

In this case, Region A has a glance view function for providing a user with a glance view. And, the controller 520 displays a critical information of a priority higher than a reference value in the received information on Region A.

Region B is a screen created as the rollable display module 530 is extended. The controller 520 displays a detailed information in the received information on Region B.

Like an embodiment 710, while a screen length of the rollable display module is minimized, Region A is displayed on the screen only.

The received information may include a critical information and a detailed information.

The controller 520 displays the critical information in the received information on Region A.

Like an embodiment 720, as the screen length of the rollable display module 530 increases gradually, Region B and Region A are displayed on the screen together.

The critical information and the detailed information are described as follows.

First of all, in case that a specific application is run, a critical information is a header information of the specific application. And, a detailed information is an information related to the header information.

In case of a text message, a critical information is an information including a sender information, a phone number and a $1^{st}$ sentence. And, a detailed information is a text body content.

In case that a web browser is run, a critical information includes an address information and a URL information. And, a detailed information includes a webpage text body.

In case that a time check function is run, a critical information includes today's date and a current time information. And, a detailed information includes a schedule after a current time. In this case, the schedule after the current time includes an information indicating meeting participants, a meeting time and a meeting place.

In case that a weather check function is run, a critical information includes a current weather information. And, a detailed information includes a weather information after a current time.

In case that a calendar function is run, a critical information includes a current time, a schedule and a title. And, a detailed information includes details of a schedule.

FIG. 8 is a diagram of an inner configuration of a wearable device including a rollable display module according to one embodiment of the present invention.

Referring to FIG. 8, a transparent glass window 550 is mounted on a top portion of one end of a rollable display module 530.

A controller 520 displays a $1^{st}$ information on a screen below the transparent glass window 550.

In this case, the $1^{st}$ information includes a critical information.

Like an embodiment 810, 'A' indicates the transparent glass window 550 and is constructed with transparent tempered glass.

'B' indicates the rollable display module 530.

'C' indicates a spiral spring configured to play a role as a clockwork. 'C' indicates the same spring device provided to a tape measure devised not to revolve over a specific count of revolutions.

'D' indicates a connecting device configured to connect the spiral spring and the controller 520 to each other. The connecting device D connects the spiral spring and the controller 520 to each other and then delivers a revolution count information of the spiral spring to the controller 520.

'E' indicates the controller 520 configured to perform a drive IC function.

'F' indicates a handle that connects a wrist strap G and the rollable display module 530 to each other.

'G' indicates the wrist strap. A length of the wrist strap can be decreased if a length of the rollable display module 530 is increased. The corresponding details shall be described with reference to FIG. 19 later.

Like an embodiment 820, 'A' indicates the transparent glass window 550 formed of transparent tempered glass.

If a user pulls the handle F in a bottom direction, the length of the rollable display module 530 is increased.

An embodiment 830 shows a cross-sectional view of the spiral spring.

In viewpoints of a $1^{st}$ region and a $2^{nd}$ region, when the controller 520 determines the $2^{nd}$ region, the controller 520 may determine the $2^{nd}$ region based on a force applied to the spring C and a moving quantity of the handle F.

In viewpoints of Region A and Region B, when the controller 520 determines Region B, the controller 520 may determine Region B based on a force applied to the spring C and a moving quantity of the handle F.

FIG. 9 is a diagram to describe one example of when a screen is unrolled, partitioning the screen into Region A and Region B according to one embodiment of the present invention.

Referring to FIG. 9, a partitioned screen region is determined in accordance with a rolled-up state, a half-unrolled state, or a fully unrolled state of the rollable display module 530.

The controller 520 calculates an angular speed of a rotating shaft of the rollable display module 530 and then adjusts a location of a Region-A displayed part and a location of a Region-B displayed part by real time based on the calculated angular speed.

FIG. 10 is a diagram to describe one example of when a screen length of a rollable display module according to one embodiment of the present invention is extended, newly creating a $2^{nd}$ region, displaying a $1^{st}$ information and a $2^{nd}$ information on a screen to correspond to the newly created $2^{nd}$ region, and displaying a critical information and a detailed information on Region A and Region B, respectively.

Referring to FIG. 10, like an embodiment 1010, in case of a state that the rollable display module 530 is rolled up, the controller 520 displays a text a on a $1^{st}$ region of a screen. In this case, the text a may correspond to a $1^{st}$ information of a specific content.

In viewpoints of Region A and Region B, the controller 520 displays the text a corresponding to a critical information on Region A.

Like an embodiment 1020, in case of a state that the rollable display module 530 is half-rolled, an input of adjusting a screen length by unrolling the rollable display module 530 reset to a rolled-up state is received from a user.

In response to the received input, the controller 520 displays the text a on a portion or whole part of a $2^{nd}$ region. And, the controller 520 displays a text b on a $1^{st}$ region.

In this case, the text a corresponds to the $1^{st}$ information of the specific content and the text b corresponds to a $2^{nd}$ information, which is different from the $1^{st}$ information, of the specific content.

In doing so, the amount of the $2^{nd}$ information is determined in accordance with a size of the $2^{nd}$ region.

In viewpoints of Region A and Region B, the controller 520 displays the text a corresponding to a critical information on Region A and also displays the text b corresponding to a detailed information on Region B.

Like an embodiment 1030, in case of a state that the rollable display module 530 is fully unrolled, an input of adjusting a screen length by unrolling the rollable display module 530 reset to a rolled-up state is received from a user.

In response to the received input, the controller 520 displays the text a on a portion of a $2^{nd}$ region. The controller 520 displays a text c on a $1^{st}$ region. And, the controller 520 displays the text b on a portion of the $2^{nd}$ region.

In this case, the text a corresponds to the $1^{st}$ information of the specific content and the text b may correspond to the $2^{nd}$ information, which is different from the $1^{st}$ information, of the specific content.

In doing so, the amount of the $2^{nd}$ information is determined in accordance with a size of the $2^{nd}$ region.

In viewpoints of Region A and Region B, the controller 520 displays the text a corresponding to a critical information on Region A and also displays the text b and the text c corresponding to detailed informations on Region B.

If an input for decreasing a screen length is received from a user in '3. Fully-unrolled state', '2. Half-unrolled state' and '1. Rolled-up state' are entered in order.

In particular, in viewpoints of the $1^{st}$ region and the $2^{nd}$ region, if the rolled-up rollable display module 530 is half unrolled, as the screen length is increased, the $1^{st}$ region moves down, the $2^{nd}$ region is created, the text a is displayed on a whole part of the $2^{nd}$ region, and the text b is displayed on the $1^{st}$ region.

On the other hand, if the rolled-up rollable display module 530 is fully unrolled, as the screen length is increased, the $1^{st}$ region moves down to the bottom, the $2^{nd}$ region is created, the text a is displayed on a portion of the $2^{nd}$ region, and the text c is displayed on the $1^{st}$ region.

FIG. 11 is a diagram to describe one example of when a screen length of a rollable display module according to one embodiment of the present invention is extended, newly creating a $2^{nd}$ region, displaying a $1^{st}$ information and a $2^{nd}$ information on a screen to correspond to the newly created $2^{nd}$ region, and displaying a critical information and a detailed information on Region A and Region B, respectively.

Referring to FIG. 11, like an embodiment 1110, if the rollable display module 530 is in rolled-up state, the controller 520 displays '02-2630-3902' on a $1^{st}$ region of a screen. In this case, '02-2630-3902' may correspond to a $1^{st}$ information of a specific content.

In viewpoints of Region A and Region B, the controller 520 displays a counterpart content '02-2630-3902', which is a critical information, on Region A.

Like an embodiment 1120, when the rollable display module 530 is in half-unrolled state, an input for adjusting a screen length by unrolling the rollable display module 530 rest to the rolled-up state is received from a user.

In response to the received input, the controller 520 displays '02-2630-3902' on a portion or whole part of a $2^{nd}$ region. And, the controller 520 displays 'Title: Shinsege Gift Card Mobile Coupon' on a $1^{st}$ region.

In this case, '02-2630-3902' corresponds to a $1^{st}$ information of a specific content and 'Title: Shinsege Gift Card Mobile Coupon' corresponds to a $2^{nd}$ information, which is different from the $1^{st}$ information, of the specific content.

In viewpoints of Region A and Region B, the controller 520 displays a sender contact '02-2630-3902' corresponding to the critical information on Region A and also displays a text title 'Title: Shinsege Gift Card Mobile Coupon' corresponding to the detailed information on Region B.

Like an embodiment 1130, when the rollable display module 530 is in fully-unrolled state, an input for adjusting a screen length by unrolling the rollable display module 530 rest to the rolled-up state is received from a user.

In response to the received input, the controller 520 displays '02-2630-3902' on a portion or whole part of a $2^{nd}$ region. The controller 520 displays a personal number and an authentication (or certification) number on a $1^{st}$ region. And, the controller 520 displays 'Title: Shinsege Gift Card Mobile Coupon' on a portion of the $2^{nd}$ region.

In this case, '02-2630-3902' corresponds to a $1^{st}$ information of a specific content and the personal number and the authentication (or certification) number may corresponds to a $2^{nd}$ information, which is different from the $1^{st}$ information, of the specific content.

In viewpoints of Region A and Region B, the controller 520 displays a sender contact '02-2630-3902' corresponding to the critical information on Region A and also displays 'Title: Shinsege Gift Card Mobile Coupon' and 'personal number and authentication (or certification) number' corresponding to detailed informations on Region B.

FIG. 12 is a diagram to describe one example of after a screen length has been extended in part, if a user swipes a screen with a finger, displaying a different region of a content currently displayed on a screen according to one embodiment of the present invention.

Referring to FIG. 12, if a screen length is increased by a prescribed length and a touch input applied in a direction from a $1^{st}$ point on a screen to a $2^{nd}$ point different from the $1^{st}$ point on the screen is then received from a user, the controller 520 displays a region different from a specific region of a specific content currently displayed on the screen in response to the touch input.

Like an embodiment 1210, 'Title: Shinsege Gift Card Mobile Coupon, Personal number, Authentication number' is currently displayed on a screen.

After a user has increased a screen length by 1 cm by pulling the rollable display module 530, if a touch input 1212 of swiping from a $1^{st}$ point on the screen to a $2^{nd}$ point on the screen is received from the user, like an embodiment 1220, the controller 520 controls 'Product name, Exchanger, Valid until, Content, etc.', which corresponds to another region of a text message currently displayed on the screen, to be displayed on the screen in response to the touch input.

FIG. 13 is a diagram to describe one example of partitioning a screen into Region A and Region B in accordance with a content according to one embodiment of the present invention.

Referring to FIG. 13, an embodiment 1310 corresponds to a case of a list type. The controller 520 displays a list including a title and a subject on Region A and also displays a text body on Region B.

An embodiment 1320 corresponds to a case of a tab menu selection type. The controller 520 displays a tab menu on Region A and also displays a text body on Region B.

An embodiment 1330 corresponds to a case of a search engine type. The controller 520 displays a search window on Region A and also displays a text body on Region B.

FIG. 14 is a diagram to describe one example that a message is handled as read in response to an action of pulling Region B slightly and then releasing it according to one embodiment of the present invention.

Referring to FIG. 14, while a specific application is run, if a screen length is increased by a prescribed length and an input for minimizing the screen length is then received within a prescribed time from a user, the controller 520 controls a message related to a specific content, which is currently displayed on a screen, to be displayed on the screen.

Like an embodiment 1410, if a text message is received, a screen length is increased by a prescribed length. Thereafter, if an input for minimizing the screen length is received within 1 second from a user, as shown in an embodiment 1420, the controller 520 displays a message, which indicates that the text message is read, on the screen.

In particular, like an embodiment 1430, if a user slightly pulls and then releases Region B, the controller 520 processes that a corresponding message is read.

According to the present invention, a message read processing can be executed by a simple action applied as if a user slightly pulls and then releases Region B, whereby user convenience can be enhanced.

FIG. 15 is a diagram to describe one example of while a specific application is run, if Region B is swiped left to right, changing a tab menu of a specific content currently displayed on a screen according to one embodiment of the present invention.

Referring to FIG. 15, while a specific application is run, if a screen length is increased by a prescribed length and a touch input applied in a specific direction from a $1^{st}$ point on a screen to a $2^{nd}$ point different from the $1^{st}$ point on the screen is then received from a user, the controller 520 changes a tab menu of a specific content currently displayed on the screen and then displays a content, which corresponds to the changed tab menu, on the screen.

For instance, like an embodiment 1510, while a specific application is run, if a screen length is increased by about 2 cm and a touch input 1514 applied in a specific direction from a left side of a screen to a right side of the screen is then received from a user, the controller 520 changes a tab menu of a specific content from a $1^{st}$ tab 1512 to a $2^{nd}$ tab 1522 and then displays a text body of a content corresponding to the changed tab menu on Region B.

FIG. 16 is a diagram to describe one example of running a search function according to one embodiment of the present invention.

Referring to FIG. 16, while a specific application is run, if a screen length is increased by a prescribed length and an input of touching a screen is then received from a user, the controller 520 displays a keypad for applying a text input on the screen. If a voice is received from a user, the controller 520 searches for a search word corresponding to the received voice.

For instance, like an embodiment 1610, while a search application such as Naver, Google, or the like is run, a screen length is increased by about 2 cm. Thereafter, if an input 1612 of touching a screen is received from a user, the controller 1630 controls a text input window 1630, which is a keypad for applying a text input, to be displayed on Region B of the screen.

Like an embodiment 1620, if a voice is received from a user, the controller 520 displays a search word corresponding to the received voice on Region A of the screen and then searches for the displayed search word.

FIG. 17 is a diagram to describe one example of if Region B is pulled to the end, running an auto scroll function or displaying a scroll bar on a screen according to one embodiment of the present invention.

Referring to FIG. 17, if a screen length is maximum, the controller 520 automatically scrolls a screen.

If a screen length is maximum, the controller 520 controls a scroll bar movable on a screen to be displayed on a specific region of the screen.

Like an embodiment 1710, if a screen length is maximum (i.e., if a user pulls Region B to the end), the controller 520 runs a function 1712 of scrolling a screen automatically.

Like an embodiment 1720, if a screen length is maximum (i.e., if a user pulls Region B to the end), the controller 520 controls a scroll bar 1722, which moves on a screen, to be displayed on a specific region of the screen.

FIG. 18 is a diagram to describe one example of switching a current message to a next message by pulling Region B to the end, minimizing Region B, and then pulling Region B again according to one embodiment of the present invention.

Referring to FIG. 18, if a screen length is increased to the maximum and an input for minimizing the screen length is then received within a prescribed time from a user, the controller 520 controls a $2^{nd}$ content, which is different from a $1^{st}$ content corresponding to a specific content currently displayed on a screen, to be displayed on the screen.

Like an embodiment 1810, if a screen length is increased to the maximum and an input for minimizing the screen length is then received within 1 second from a user, as shown in an embodiment 1820, the controller 520 controls a next message, which is different from a current message currently displayed on a screen, to be displayed on Region B.

FIG. 19 is a diagram to describe one example of if a screen is increased by a specific length in response to an action of puling Region B, maintaining an overall length of a wearable device by decreasing a length of another portion of the wearable device by the specific length according to one embodiment of the present invention.

Referring to FIG. 19, as a user pulls Region B so that a screen can be increased by about 2 cm [Embodiment 1910], the controller 520 controls a length of another part of the wearable device to be decreased by the increased screen length of 2 cm to correspond to the increased screen length of 2 cm.

In particular, by inserting a $1^{st}$ end portion 1922 of the wearable device into a $2^{nd}$ end portion 1924 of the wearable device, the length of another part of the wearable device is decreased. Hence, a total length of the wearable device is maintained constantly.

According to one embodiment of the present invention, critical information can be displayed on a screen in an initial state that a rollable display module is rolled up and critical information and detailed information can be displayed on a screen in a state that the rollable display module is unrolled, whereby user convenience can be enhanced.

According to another embodiment of the present invention, a $1^{st}$ information is displayed on a $1^{st}$ region using the property of a bendable and rollable display module and a $2^{nd}$ information and the $1^{st}$ information are displayed on the $1^{st}$ region and a portion or whole part of a $2^{nd}$ region in accordance with a screen length extension of the rollable display module, respectively, whereby information can be displayed differently to cope with a length change attributed to the scroll unrolling.

According to another embodiment of the present invention, user convenience can be enhanced in a manner of running a function of automatically scrolling a screen in response to a user's action of pulling out a rollable display module to the end.

According to another embodiment of the present invention, user convenience can be enhanced in a manner of switching a current message to a next message in response to a user's action of pulling out a rollable display module to the end and then releasing the rollable display module.

According to further embodiment of the present invention, user convenience can be enhanced in a manner that a current message is handed as read in response to a user's action of pulling out a rollable display module slightly and then releasing the rollable display module.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

MODE FOR THE INVENTION

Various embodiments have been described in the best mode for carrying out the disclosure.

INDUSTRIAL APPLICABILITY

The present invention relates to a wearable device and is industrially usable.

The invention claimed is:

1. A method of controlling a wearable device including a rollable display, the method comprising:
   displaying a first information of a specific content on a first region of the rollable display;
   in response to a user extending the rollable display to expose a second region of the rollable display, displaying the first information on the second region and displaying a second information of the specific content different from the first information of the specific content on the first region; and
   in response to the user extending the rollable display by a prescribed length and applying a touch input from a first point on the rollable display toward a second point on the rollable display different from the first point, displaying a different portion of the first information on the second region,
   wherein the prescribed length of the second region of the rollable display is maintained constant while the different portion of the first information is displayed on the second region in response to the touch input,
   wherein the wearable device includes a wrist band configured to be placed on a wrist, and
   wherein the method further comprises:
   displaying a tab menu including a plurality of tabs;
   displaying a third information on the rollable display corresponding to a first tab among the plurality of tabs; and
   in response to the user extending the rollable display by a prescribed length and applying a touch input from a first point on the rollable display to a second point on the rollable display different from the first point, displaying a fourth information corresponding to a second tab among the plurality of tabs.

2. The method of claim 1, wherein the second information comprises detailed information of the first information.

3. The method of claim 1, further comprising in response to the user extending the rollable display to a maximum display length, automatically scrolling the rollable display.

4. The method of claim 1, further comprising in response to the user extending the rollable display to a maximum display length, displaying a scroll bar movable on the rollable display on a specific region of the rollable display.

5. The method of claim 1, further comprising while a specific application is running, in response to the user extending the rollable display by a prescribed length and then contracting the rollable display within a second prescribed time, displaying a message related to the specific application on the rollable display.

6. The method of claim 1, further comprising:
   while a specific application is running, in response to the user extending the rollable display by a prescribed length and applying a touch input to the rollable display, displaying a keypad for inputting a text on the rollable display; and
   in response to a voice received from the user, searching for a search word corresponding to the received voice.

7. A wearable device, comprising:
   a rollable display; and
   a controller configured to:
   display a first information of a specific content on a first region of the rollable display,
   in response to a user extending the rollable display to expose a second region of the rollable display, display the first information on the second region and displaying a second information of the specific content different from the first information on the first region,
   determine the amount of the second information depending on a size of the second region, and
   in response to the user extending the rollable display by a prescribed length and applying a touch input from the first point on the rollable display toward a second point on the rollable display different from the first point, display a different portion of the first information on the second region, wherein the length of the second region of the rollable display is maintained constant while the different portion of the first information is displayed on the second region in response to the touch input, wherein the wearable device includes a wrist band configured to be placed on a wrist, and wherein the controller is further configured to:

display a tab menu including a plurality of tabs, display a third information on the rollable display corresponding to a first tab among the plurality of tabs, and in response to the user extending the rollable display by a prescribed length and applying a touch input from a first point on the rollable display to a second point on the rollable display different from the first point, display a fourth information corresponding to a second tab among the plurality of tabs.

8. The wearable device of claim 7, further comprising a transparent glass window mounted on a top portion of one end of the rollable display, wherein the controller is further configured to display the first information on the rollable display below the transparent glass window.

9. The wearable device of claim 7, wherein in response to the user extending the rollable display to a maximum display length, the controller is further configured to scroll the rollable display automatically.

10. The wearable device of claim 7, wherein in response to the user extending the rollable display to a maximum display length, the controller is further configured to display a scroll bar movable on the rollable display on a specific region of the rollable display.

11. The wearable device of claim 7, wherein while a specific application is running, in response to the user extending the rollable display by a prescribed length and then contracting the rollable display within a second prescribed time, the controller is further configured to display a message related to the specific application on the rollable display.

12. The wearable device of claim 7, wherein while a specific application is running, in response to the user extending the rollable display by a prescribed length and applying a touch input to the rollable display, the controller is further configured to display a keypad for inputting a text on the rollable display, and wherein in response to a voice received from the user, the controller is further configured to search for a search word corresponding to the received voice.

13. The wearable device of claim 7, wherein the rollable display is connected to the wrist band via a handle, and wherein the rollable display is extended from a rolled-up state to an extended state in which a length of the rollable display is extended in response to a pulling force of the handle.

14. The wearable device of claim 13, wherein the first region of the rollable display is only visible in the rolled-up state, and wherein the first and second regions of the rollable display are visible in the extended state.

15. The wearable device of claim 13, wherein the rollable display includes a compartment encompassing the rollable display in the rolled-up state.

16. The wearable device of claim 15, wherein the compartment includes a transparent glass disposed at an angle to provide a glance view of the first information in the first region, and wherein the second region of the rollable display is disposed at an angle different than the angle of the transparent glass.

17. The wearable device of claim 15, wherein the controller is disposed within the compartment and connected to a spring configured to roll and unroll the rollable display in response to the handle being moved.

18. The wearable device of claim 7, wherein a length of the wrist band is reduced in correspondence with an increase in the length of the rollable display.

* * * * *